(12) United States Patent
Jang

(10) Patent No.: US 12,382,198 B2
(45) Date of Patent: Aug. 5, 2025

(54) IMAGING APPARATUS AND AN IMAGING SYSTEM INCLUDING THE IMAGING APPARATUS

(71) Applicant: SAMSUNG ELECTRONICS CO., LTD., Suwon-si (KR)

(72) Inventor: Youngtae Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/370,417

(22) Filed: Sep. 20, 2023

(65) Prior Publication Data
US 2024/0251185 A1 Jul. 25, 2024

(30) Foreign Application Priority Data
Jan. 20, 2023 (KR) .................. 10-2023-0009036

(51) Int. Cl.
H04N 25/771 (2023.01)
H04N 23/55 (2023.01)
H04N 25/75 (2023.01)
H04N 25/766 (2023.01)

(52) U.S. Cl.
CPC ......... H04N 25/771 (2023.01); H04N 23/55 (2023.01); H04N 25/75 (2023.01); H04N 25/766 (2023.01)

(58) Field of Classification Search
CPC .... H04N 25/771; H04N 25/75; H04N 25/766; H04N 23/55; H04N 25/46
See application file for complete search history.

(56) References Cited

U.S. PATENT DOCUMENTS

| 6,574,042 | B2 | 6/2003 | Allio |
| 6,995,920 | B2 | 2/2006 | Nurishi |
| 7,349,062 | B2 | 3/2008 | Neil et al. |
| 9,936,123 | B2 | 4/2018 | Johnson |
| 11,086,109 | B2 | 8/2021 | Sasaki et al. |
| 11,089,190 | B2 * | 8/2021 | Attar ............... H04N 23/631 |
| 11,467,482 | B2 | 10/2022 | Akamatsu et al. |
| 2021/0185198 | A1 * | 6/2021 | Attar ............... G02B 13/06 |

(Continued)

FOREIGN PATENT DOCUMENTS

WO 2021-241011 12/2021

Primary Examiner — Nicholas G Giles
(74) Attorney, Agent, or Firm — Morgan, Lewis & Bockius LLP

(57) ABSTRACT

An imaging apparatus including: a lens configured to squeeze a real image to generate a squeezed image having a first aspect ratio; and an image sensor including pixels and configured to capture the squeezed image and generate image data corresponding to a final image having a second aspect ratio greater than the first aspect ratio, the squeezed image includes subregions respectively corresponding to the pixels, each of the pixels includes: a first photoelectric conversion element configured to generate a first photocharge packet; a second photoelectric conversion element configured to generate a second photocharge packet; and a floating diffusion node connected to the first photoelectric conversion element and the second photoelectric conversion element, the final image includes: a first pixel section corresponding to a first pixel signal based on the first photocharge packet; and a second pixel section corresponding to a second pixel signal based on the second photocharge packet.

20 Claims, 18 Drawing Sheets

(56) References Cited

U.S. PATENT DOCUMENTS

2021/0218928 A1 7/2021 Ise
2022/0050271 A1 2/2022 Li et al.
2023/0061593 A1 3/2023 Nishio et al.

* cited by examiner

IMAGING APPARATUS AND AN IMAGING SYSTEM INCLUDING THE IMAGING APPARATUS

CROSS-REFERENCE TO RELATED APPLICATION

This application claims priority under 35 U.S.C. § 119 to Korean Patent Application No. 10-2023-0009036, filed on Jan. 20, 2023, in the Korean Intellectual Property Office, the disclosure of which is incorporated by reference herein in its entirety.

TECHNICAL FIELD

The inventive concept relates to an imaging apparatus and an imaging system including the imaging apparatus.

DISCUSSION OF RELATED ART

Image sensors, which are designed to capture images and convert them into electrical signals, are used in a wide variety of applications. They are found not only in consumer electronics such as digital cameras, mobile phone cameras, and portable camcorders, but also in cameras mounted on automobiles, security devices, and robots.

In recent years, the usage of image sensors and filming activities has also increased. Consequently, there is a growing need for research into lenses and image processing methods capable of capturing wide-format images that extend beyond the field of view of current image sensors.

SUMMARY

The inventive concept provides an imaging apparatus and an imaging system including the imaging apparatus. The imaging apparatus includes a lens configured to squeeze (e.g., compress) a real image to generate a squeezed image having a first aspect ratio that is less than the aspect ratio of the real image. The imaging apparatus also includes an image sensor configured to capture the squeezed image and generate image data that corresponds to a final image having a second aspect ratio that is greater than the first aspect ratio.

According to an embodiment of the inventive concept, there is provided an imaging apparatus including: a lens configured to squeeze a real image to generate a squeezed image having a first aspect ratio; and an image sensor including a plurality of pixels and configured to capture the squeezed image using the plurality of pixels and generate image data corresponding to a final image having a second aspect ratio that is greater than the first aspect ratio, wherein the squeezed image comprises a plurality of subregions respectively corresponding to the plurality of pixels, wherein each of the plurality of pixels includes: a first photoelectric conversion element configured to generate a first photocharge packet in response to incident light on a first section included in a corresponding subregion; a second photoelectric conversion element configured to generate a second photocharge packet in response to incident light on a second section included in the corresponding subregion, wherein the second section is adjacent to the first section in a first direction; and a floating diffusion node connected to the first photoelectric conversion element and the second photoelectric conversion element, wherein the final image includes: a first pixel section corresponding to a first pixel signal that is based on the first photocharge packet; and a second pixel section corresponding to a second pixel signal that is based on the second photocharge packet, wherein the second pixel section is adjacent to the first pixel section.

According to an embodiment of the inventive concept, there is provided an imaging apparatus including: a lens configured to squeeze a real image to generate a squeezed image having a first aspect ratio; and an image sensor including a plurality of pixels and configured to capture the squeezed image using the plurality of pixels and generate image data corresponding to a final image having a second aspect ratio that is greater than the first aspect ratio, wherein the squeezed image includes a plurality of subregions respectively corresponding to the plurality of pixels, wherein each of the plurality of pixels includes M*N photoelectric conversion elements arranged in an M×N matrix and respectively corresponding to M*N sections included in a corresponding subregion, the M*N photoelectric conversion elements being configured to generate photocharge packets in response to incident light on the M*N sections, wherein the final image includes N pixel sections each based on photocharge packets generated by M photoelectric conversion elements that are consecutive in a second direction among the M*N photoelectric conversion elements, wherein each of the M and the N is an integer greater than or equal to 2.

According to an embodiment of the inventive concept, there is provided an imaging system including: a lens configured to squeeze a real image to generate a squeezed image having a first aspect ratio; an image sensor including a plurality of pixels and configured to capture the squeezed image via the plurality of pixels to generate image data corresponding to a final image having a second aspect ratio that is greater than the first aspect ratio; and a processor configured to perform re-mosaic processing on the image data, wherein the squeezed image include a plurality of subregions respectively corresponding to the plurality of pixels, wherein each of the plurality of pixels includes: a first photoelectric conversion element configured to generate a first photocharge packet in response to incident light on a first section included in a corresponding subregion; a second photoelectric conversion element configured to generate a second photocharge packet in response to incident light on a second section included in the corresponding subregion, wherein the second section is adjacent to the first section in a first direction; and a floating diffusion node connected to the first photoelectric conversion element and the second photoelectric conversion element, wherein the final image includes a first pixel section corresponding to a first pixel signal based on the first photocharge packet, and a second pixel section corresponding to a second pixel signal based on the second photocharge packet, and the first pixel section and the second pixel section are adjacent to each other in the first direction.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
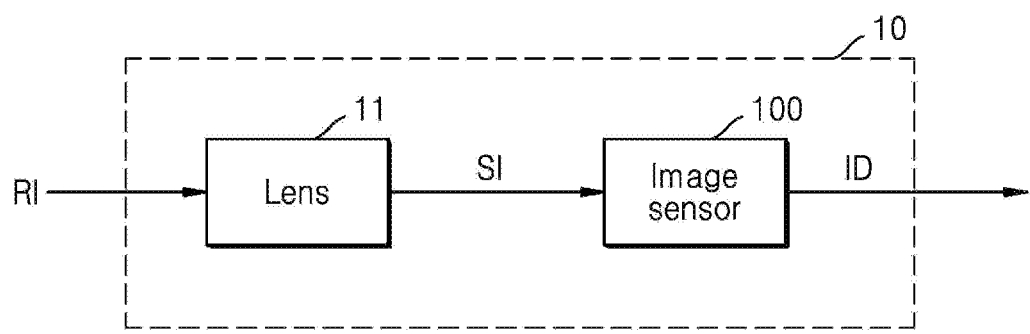
FIG. 1 is a block diagram illustrating an imaging apparatus according to an embodiment.

FIG. 1 is a block diagram illustrating an imaging apparatus 10 according to an embodiment.

Referring to FIG. 1, the imaging apparatus 10 may include a lens 11 and an image sensor 100.

The imaging apparatus 10 may be included in electronic apparatuses having an image capture or light sensing function. For example, the imaging apparatus 10 may be included in electronic apparatuses such as a digital still camera, a digital video camera, a smartphone, a wearable device, an Internet of Things (IoT) device, a tablet personal computer (PC), a personal digital assistant (PDA), a portable multimedia player (PMP), or a navigation device. In addition, the imaging apparatus 10 may be included in electronic apparatuses provided as parts of vehicles, furniture, manufacturing facilities, doors, various measuring devices, or the like.

The lens 11 may receive, as a real image RI, light reflected from an object and/or a background that are located within a field of view (or angle of view). The lens 11 may compress (e.g., squeeze) the real image RI by refracting light corresponding to the real image RI. The real image RI squeezed by the lens 11 may be referred to as a squeezed image SI. The lens 11 may provide the light corresponding to the squeezed image SI to the image sensor 100. In other words, the image sensor 100 may receive light refracted by the lens 11. The image sensor 100 may capture the real image RI squeezed by the lens 11. In other words, the image sensor 100 may capture the squeezed image SI.

The lens 11 may have different curvatures in the vertical direction and the left-to-right direction, and thus, light passing through the lens 11 may be refracted according to a vertical refractive index and a left-to-right refractive index that are different from each other. Therefore, the aspect ratio of the real image RI may be different from the aspect ratio of the squeezed image SI when light reflected from an object and/or a background located within the field of view of the lens 11 is refracted by the lens 11 while passing through the lens 11. Here, the term "aspect ratio" may refer to the ratio of the horizontal length of an image to the vertical length of the image. For example, because light is refracted by the lens 11, the aspect ratio of a real image RI may be greater than the aspect ratio of a squeezed image SI. This is so, because more light is produced by the real image RI. The lens 11 may be an anamorphic lens. The anamorphic lens may be a lens that is capable of squeezing a real image to an aspect ratio less than or equal to the aspect ratio of the image sensor 100, and due to the anamorphic lens, the image sensor 100 may capture an image having an aspect ratio greater than the aspect ratio of the image sensor 100. Here, the aspect ratio of the image sensor 100 refers to the maximum aspect ratio of images that may be captured by the image sensor 100 under the structural characteristics of the image sensor 100 (for example, the number and/or arrangement of pixels included in a pixel array of the image sensor 100).

The image sensor 100 may generate image data ID corresponding to a final image by receiving light corresponding to the squeezed image SI that was compressed by the lens 11. The image sensor 100 may include a plurality of pixels, and each of the pixels may include at least two photoelectric conversion elements. This is described below with reference to FIG. 5.

The image sensor 100 may generate the image data ID corresponding to the final image by receiving light corresponding to the squeezed image SI through at least two photoelectric conversion elements included in each of the pixels and reading out each of photocharge packets generated by the at least two photoelectric conversion elements in response to the received light. Here, the term "photocharge packet" (or quantity of electric charge) refers to a bundle of photocharges generated by a photoelectric conversion element in response to light.

The imaging apparatus 10 may generate image data ID corresponding to a final image having an aspect ratio greater than the aspect ratio of the image sensor 100 without additional de-squeezing having to be performed by a processor by squeezing and capturing, by the lens 11, an image having an aspect ratio greater than the aspect ratio of the image sensor 100 and reading out each of photocharge packets generated by at least two photoelectric conversion elements included in each of the pixels. Additional software may be necessary for de-squeezing, and it may take a long time for de-squeezing by software. The imaging apparatus 10, however, may generate image data corresponding to an image having an aspect ratio greater than the aspect ratio of the image sensor 100 without performing an additional de-squeezing. In addition, the imaging apparatus 10 may generate real-time images having an aspect ratio that is greater than the aspect ratio of the image sensor 100.

Figure 2:
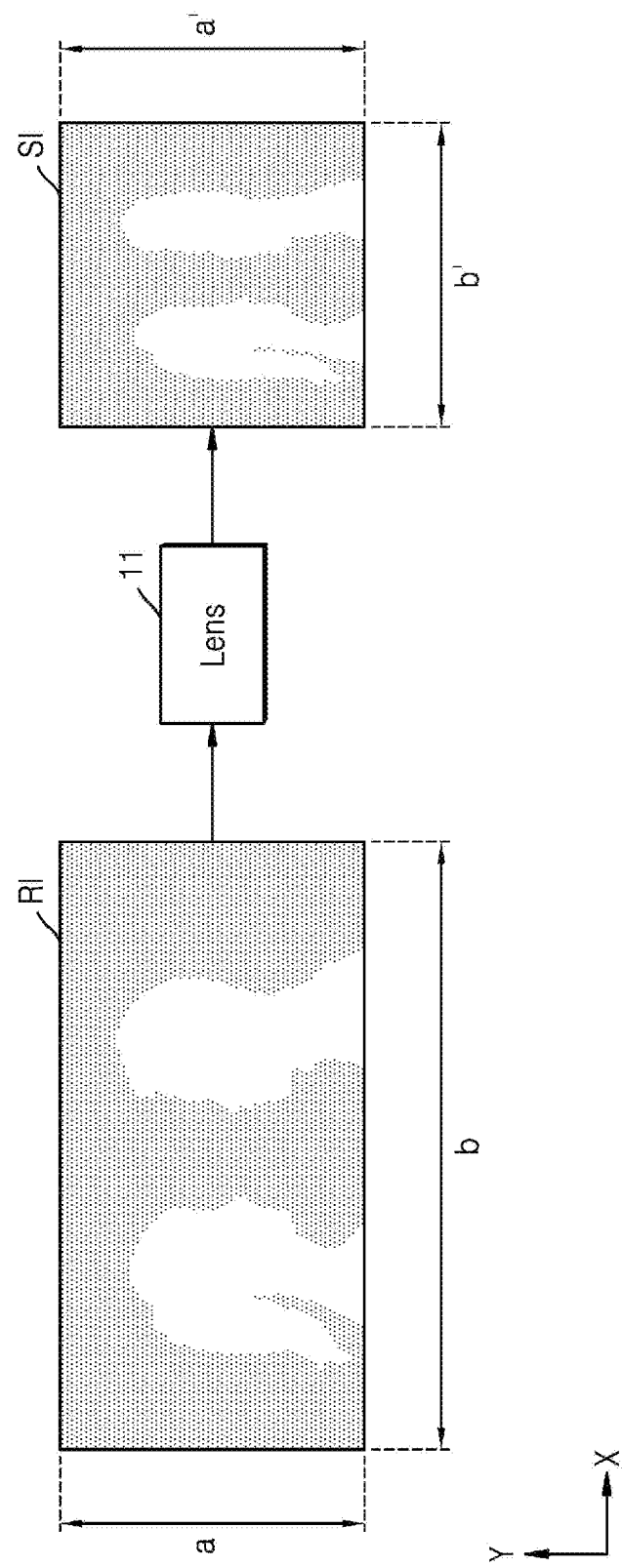
FIG. 2 is a diagram illustrating a real image and a squeezed image that has been compressed by a lens according to an embodiment.

FIG. 2 is a diagram illustrating a real image RI and a squeezed image SI that was compressed (e.g., squeezed) by the lens 11 according to an embodiment.

Referring to FIG. 2, the lens 11 may generate the squeezed image SI having an aspect ratio that is different from the aspect ratio of the real image RI by receiving light corresponding to the real image RI and refracting the light corresponding to the real image RI.

The length (or horizontal length) of the real image RI in a first direction (X direction) may be b, and the length (or vertical length) of the real image RI in a second direction (Y direction) perpendicular to the first direction may be a. Therefore, the aspect ratio of the real image RI may be b/a.

The lens 11 may generate the squeezed image SI by squeezing the real image RI. The length (or horizontal length) of the squeezed image SI in the first direction (X direction) may be b', and the length (or vertical length) of the squeezed image SI in the second direction (Y direction) perpendicular to the first direction may be a'. Therefore, the aspect ratio of the squeezed image SI may be b/a'.

In the current embodiment, the aspect ratio of the squeezed image SI may be less than the aspect ratio of the real image RI. In other words, the lens 11 may generate the squeezed image SI by squeezing the real image RI more in the first direction than in the second direction. For example, the length b' of the squeezed image SI in the first direction (X direction) may be shortened more than the length a' of the squeezed image SI in the second direction (Y direction).

Figure 3:
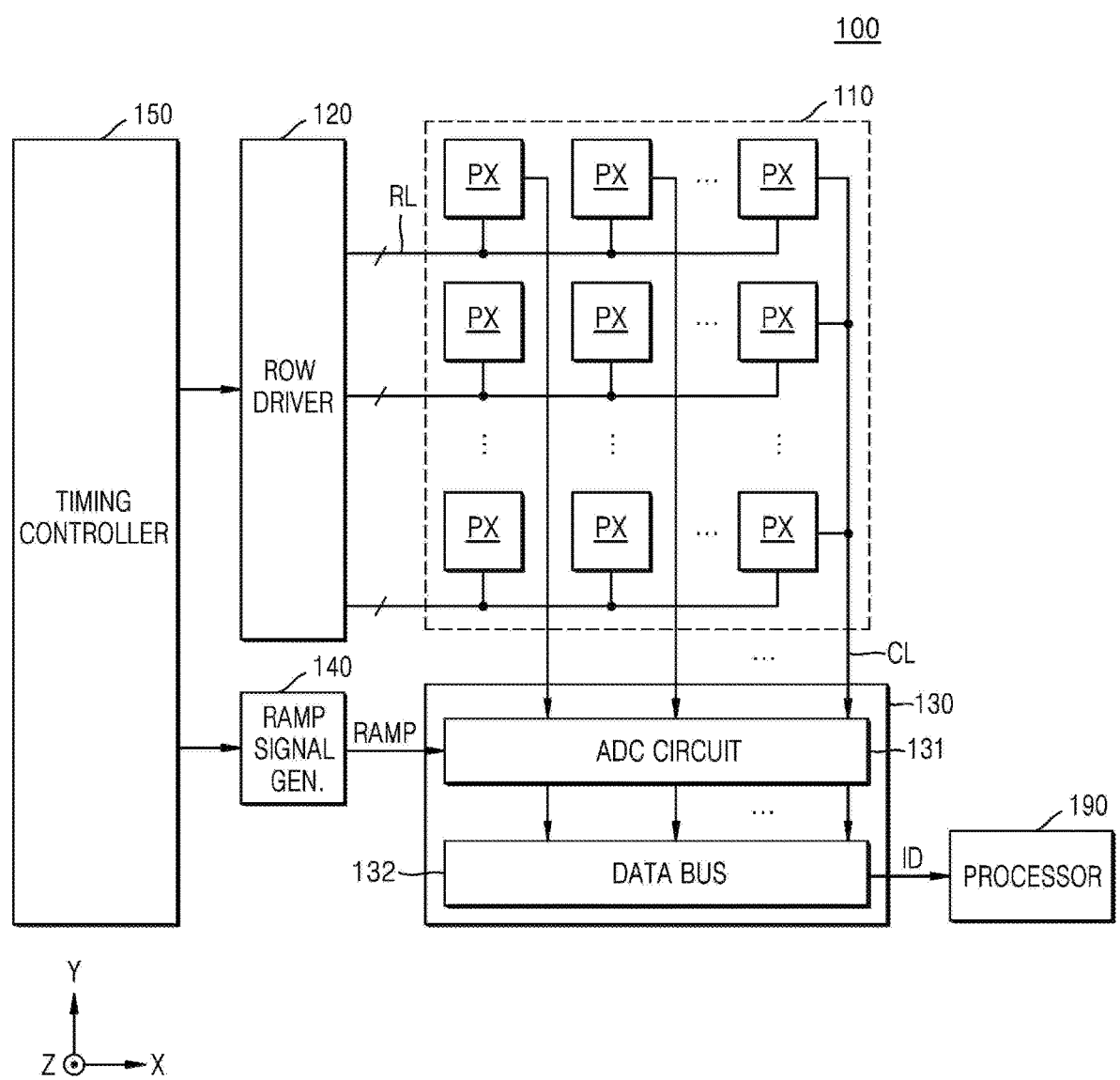
FIG. 3 is a block diagram illustrating an image sensor according to an embodiment.

FIG. 3 is a block diagram illustrating the image sensor 100 according to an embodiment.

FIG. 3 may be described with reference to FIG. 2.

Referring to FIG. 3, the image sensor 100 may include a pixel array 110, a row driver 120, a readout circuit 130, a ramp signal generator 140, and a timing controller 150, and the readout circuit 130 may include an analog-to-digital conversion (ADC) circuit 131 and a data bus 132. The image sensor 100 may further include a processor 190.

The pixel array 110 includes: a plurality of pixels PX arranged in rows and columns; and a plurality of row lines RL and a plurality of column lines CL that are connected to the pixels PX.

Each of the row lines RL may extend in the first direction (X direction) and may be connected to pixels PX arranged in the same row. For example, each of the row lines RL may transmit control signals output from the row driver 120 to transistors included in pixels PX (described below) shown in FIGS. 5, 8, 10, and 12.

According to an embodiment, each of the pixels PX may include at least one photoelectric conversion element (also referred to as a light-sensing element). The photoelectric conversion element may sense light and convert the sensed (or detected) light into photocharge(s). For example, the photoelectric conversion element may be a light-sensing element including an organic material or an inorganic material, such as an inorganic photodiode, an organic photodiode, a perovskite photodiode, a phototransistor, a photogate, or a pinned photodiode. In an embodiment, each of the pixels PX may include at least two photoelectric conversion elements.

In addition, a micro-lens for condensing light may be arranged above each of the pixels PX in a third direction (Z direction) perpendicular to the first direction (X direction) and the second direction (Y direction), or above each group of adjacent pixels PX in the third direction. Each of the pixels PX may detect light in a certain spectral range from light received through the micro-lens. Each of the pixels PX of the pixel array 110 may be a red pixel configured to convert light in a red spectral range into an electrical signal, a green pixel configured to convert light in a green spectral range into an electrical signal, or a blue pixel configured to convert light in a blue spectral range into an electrical signal. A color filter configured to transmit light in a certain spectral range may be arranged on each of the pixels PX. However, embodiments are not limited thereto, and the pixel array 110 may include pixels configured to convert light in spectral ranges other than the red, green, and blue spectral ranges into electrical signals.

In an embodiment, the lens 11 (refer to FIG. 2) may be positioned above the pixel array 110 (in the third direction). The pixel array 110 may receive light corresponding to the squeezed image SI (refer to FIG. 2) through the pixels PX.

Each of the column lines CL may extend in the second direction and may be connected to pixels PX arranged in the same column. Each of the column lines CL may transmit pixel signals of the pixels PX to the readout circuit 130 in units of rows of the pixel array 110. A pixel signal may include a reset signal and an image signal. In an embodiment, pixel signals of at least two pixels PX adjacent to each other in the second direction may be transmitted to the readout circuit 130.

The timing controller 150 may control the timing of the row driver 120, the readout circuit 130, and the ramp signal generator 140. The timing controller 150 may provide timing signals indicating operation timings respectively to the row driver 120, the readout circuit 130, and the ramp signal generator 140.

The row driver 120 may generate control signals for driving the pixel array 110 under control by the timing controller 150 and may provide the control signals to the pixels PX of the pixel array 110 through the row lines RL. The row driver 120 may control the pixels PX of the pixel array 110 to sense incident light simultaneously or in units of rows. The row driver 120 may select pixels PX in units of rows from the pixels PX and may control the selected pixels PX (for example, pixels PX in one row) to output pixel signals through the column lines CL. In an embodiment, the row driver 120 may provide a control signal to each of the pixels PX. This enables the reading out of pixel signal, at different times, based on photocharge packets generated by at least two photoelectric conversion elements included in each of the pixels PX.

The ramp signal generator 140 may generate a ramp signal RAMP that increases or decreases with a predetermined slope and may provide the ramp signal RAMP to the ADC circuit 131 of the readout circuit 130.

The readout circuit 130 may include the ADC circuit 131 and the data bus 132. The readout circuit 130 may read out pixel signals from pixels PX of a row selected by the row driver 120 from among the pixels PX. The readout circuit 130 may convert pixel signals received from the pixel array 110 through the column lines CL into digital data by using a ramp signal RAMP received from the ramp signal generator 140, thereby generating and outputting pixel values corresponding to the pixels PX in units of rows.

The ADC circuit 131 may include a plurality of ADCs respectively corresponding to the column lines CL. Each of the ADCs may compare a ramp signal RAMP with pixel signals that are received through a corresponding column line CL and may generate pixel values based on results of the comparison. For example, each of the ADCs may remove a reset signal from an image signal and may generate a pixel value indicating the amount of light sensed by a pixel PX.

A plurality of pixel values generated by the ADC circuit 131 may be output as image data ID through the data bus 132. For example, the image data ID may be provided to the processor 190 provided inside or outside the image sensor 100.

The ADC circuit 131 may include a plurality of correlated double sampling (CDS) circuits and a plurality of counter circuits. The ADC circuit 131 may convert pixel signals (for example, pixel voltages) input from the pixel array 110 into pixel values that are digital signal(s). Pixel signals respectively received through the column lines CL may be converted into pixel values (e.g., digital signals) by the CDS circuits and the counter circuits.

Each of the CDS circuits may compare pixel signals received through a column line CL with a ramp signal RAMP and may output results of the comparison. When the level of the ramp signal RAMP is equal to the level of a pixel signal, the CDS circuit may output a comparison signal that transitions from a first level (for example, logic high) to a second level (for example, logic low). A time point at which the level of the comparison signal transitions may be determined according to the level of the pixel signal.

Each of the CDS circuits may sample and hold a pixel signal provided from a pixel PX according to a CDS method and may generate a comparison signal based on a level corresponding to the difference between a specific noise level (for example, a reset signal) and an image signal (for example, a sensing signal) level that are double-sampled.

In an embodiment, each of the CDS circuits may include at least one comparator. For example, the comparator may be implemented with an operational transconductance amplifier (OTA) (or a differential amplifier).

The data bus 132 may temporarily store pixel values output from the ADC circuit 131 and may then output the pixel values. The data bus 132 may include a plurality of column memories and a column decoder. Pixel values stored in the column memories may be output as image data ID under control by the column decoder. The image data ID is data corresponding to a final image.

The processor 190 may receive the image data ID and may perform, on the image data ID, noise reduction processing, gain adjustment, waveform shaping processing, interpolation processing, white balance processing, gamma processing, edge enhancement processing, re-mosaic processing, or the like. The re-mosaic processing may refer to rearranging the order of pieces of image data ID based on pixel signals generated from the pixels PX. For example, the re-mosaic processing may be performed to convert tetra-pattern image data ID into Bayer-pattern image data ID.

Figure 4A:
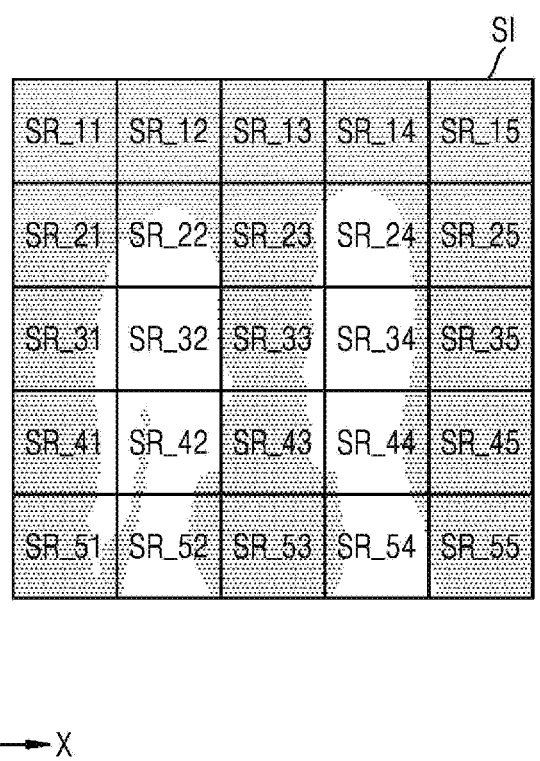
FIG. 4A is a diagram illustrating a squeezed image according to an embodiment.
Figure 4B:
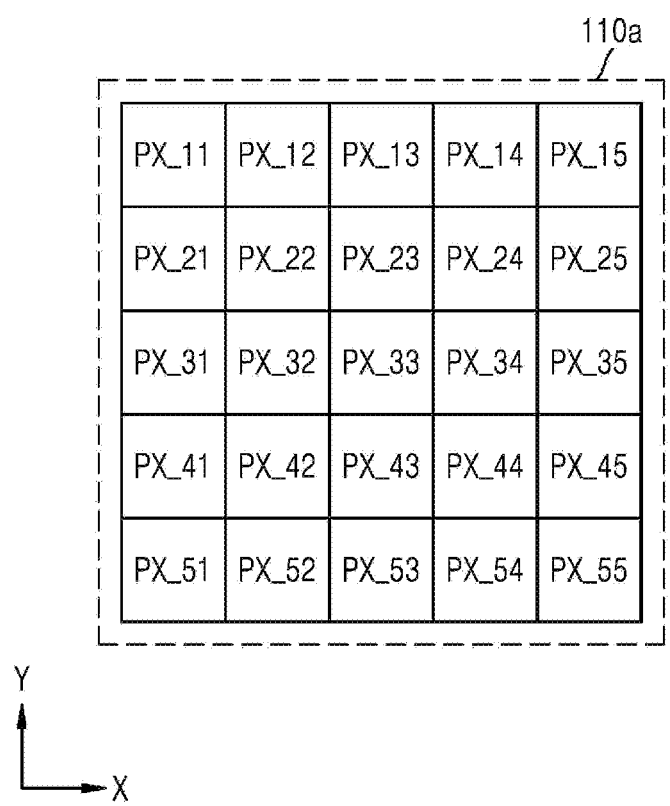
FIG. 4B is a diagram illustrating a pixel array including a plurality of pixels according to an embodiment.

FIG. 4A is a diagram illustrating a squeezed image SI according to an embodiment, and FIG. 4B is a diagram illustrating a pixel array 110a including a plurality of pixels PX_11 to PX_55 according to an embodiment.

FIG. 4B may be described with reference to FIG. 3. For example, the pixel array 110a shown in FIG. 4B may correspond to the pixel array 110 of the image sensor 100 shown in FIG. 3.

Referring to FIG. 4A, the squeezed image SI may include a plurality of subregions SR_11 to SR_55 (i.e., SR_11 to SR_15, SR_21 to SR_25, SR_31 to SR_35, SR_41 to SR_45, and SR_51 to SR_55), and referring to FIG. 4B, the pixel array 110a may include the pixels PX_11 to PX_55 (i.e., PX_11 to PX_15, PX_21 to PX_25, PX_31 to PX_35, PX_41 to PX_45, and PX_51 to PX_55).

As described above, the lens 11 (refer to FIG. 2) may generate the squeezed image SI by squeezing a real image RI, and the image sensor 100 (refer to FIG. 3) may receive light corresponding to the squeezed image SI through the pixels PX_11 to PX_55 included in the pixel array 110a.

The pixels PX_11 to PX_55 shown in FIG. 4B may respectively correspond to the subregions SR_11 to SR_55 included in the squeezed image SI shown in FIG. 4A. For example, the pixel PX_11 included in the pixel array 110a may correspond to the subregion SR_11 included in the squeezed image SI, the pixel PX_33 included in the pixel array 110a may correspond to the subregion SR_33 included in the squeezed image SI, and the pixel PX_55 included in the pixel array 110a may correspond to the subregion SR_55 included in the squeezed image SI. The pixels PX_1l to PX_55 may receive light corresponding to the subregions SR_11 to SR_55 that respectively correspond to the pixels PX_11 to PX_55. For example, the pixel PX_11 may receive light corresponding to the subregion SR_11 included in the squeezed image SI, and photoelectric conversion elements included in the pixel PX_11 may generate photocharge packets in response to the received light corresponding to the subregion SR_11.

In the present disclosure, the term "subregion" refers to light that corresponds to a region of a squeezed image received by each of a plurality of pixels included in a pixel array, and subregions may be defined differently depending on the number and arrangement of pixels included in a pixel array.

Figure 5:
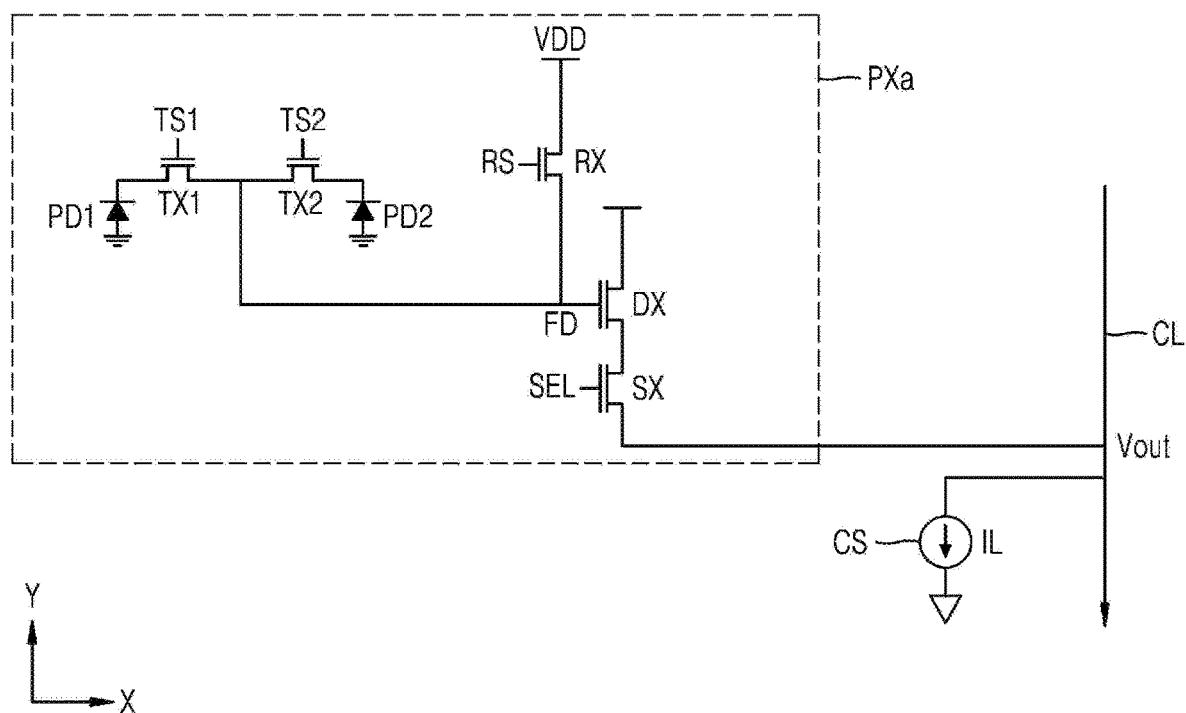
FIG. 5 is a circuit diagram illustrating a pixel according to an embodiment.

FIG. 5 is a circuit diagram illustrating a pixel PXa according to an embodiment.

For example, the structure of the pixel PXa shown in FIG. 5 may correspond to each of the pixels PX_11 to PX_55 included in the pixel array 110a shown in FIG. 4B.

Referring to FIG. 5, the pixel PXa may include a first photoelectric conversion element PD1, a second photoelectric conversion element PD2, a first transfer transistor TX1, a second transfer transistor TX2, a reset transistor RX, a driving transistor DX, and a selection transistor SX. The first photoelectric conversion element PD1 and the second photoelectric conversion element PD2 may be adjacent to each other in the first direction. The first and second transfer transistors TX1 and TX2 may be adjacent to each other in the first direction.

The first photoelectric conversion element PD1 and the second photoelectric conversion element PD2 may convert external incident light into an electrical signal. As described above, the first photoelectric conversion element PD1 and the second photoelectric conversion element PD2 may generate an electric charge according to the intensity of light. The quantities of an electric charge (or photocharge packets) generated by the first photoelectric conversion element PD1 and the second photoelectric conversion element PD2 may vary according to an image capturing environment (e.g., a low or high illumination environment). For example, a photocharge packet generated by the first photoelectric conversion element PD1 in a high-illumination environment may reach the full well capacity (FWC) of the first photoelectric conversion element PD1. However, a photocharge packet generated by the first photoelectric conversion element PD1 in a low-illumination environment may not reach the FWC of the first photoelectric conversion element PD1.

The first transfer transistor TX1, the second transfer transistor TX2, the reset transistor RX, the driving transistor DX, and the selection transistor SX may operate respectively in response to control signals provided from the row driver 120 (refer to FIG. 3) such as a first transfer control signal TS1, a second transfer control signal TS2, a reset control signal RS, and a selection control signal SEL.

The reset transistor RX may be turned on in response to the reset control signal RS having an active level to reset a floating diffusion node FD based on a pixel power supply voltage VDD.

The first photoelectric conversion element PD1 and the second photoelectric conversion element PD2 included in the pixel PXa may be connected to the floating diffusion node FD. In other words, the first photoelectric conversion element PD1 and the second photoelectric conversion element PD2 may share the floating diffusion node FD. The floating diffusion node FD may be connected to each of the first transfer transistor TX1 and the second transfer transistor TX2.

When the first transfer transistor TX1 and the second transfer transistor TX2 are turned on respectively in response to the first transfer control signal TS1 and the second transfer control signal TS2 that have an active level, photocharge packets generated respectively by the first photoelectric conversion element PD1 and the second photoelectric conversion element PD2 may transfer to the floating diffusion node FD and may accumulate in the floating diffusion node FD. The photocharge packets accumulated in the floating diffusion node FD may generate a voltage. In other words, photocharge packets accumulated in the floating diffusion node FD may be converted into a voltage.

As described above with reference to FIGS. 4A and 4B, the pixel PXa shown in FIG. 5 may receive light corresponding to a subregion corresponding to the pixel PXa. In this case, the first photoelectric conversion element PD1 and the second photoelectric conversion element PD2 included in the pixel PXa may respond to light corresponding to different regions of the subregion and may respectively generate a first photocharge packet and a second photocharge packet. This is described below with reference to FIG. 7A.

The driving transistor DX may operate as a source follower based on a bias current IL generated by a current source CS connected to a column line CL, and a voltage corresponding to the voltage of the floating diffusion node FD may be output as a pixel voltage Vout through the selection transistor SX. The pixel voltage Vout may be referred to as a pixel signal.

The selection transistor SX may be turned on in response to the selection control signal SEL having an active level and may output the pixel signal output from the driving transistor DX to the column line CL.

Figure 6:
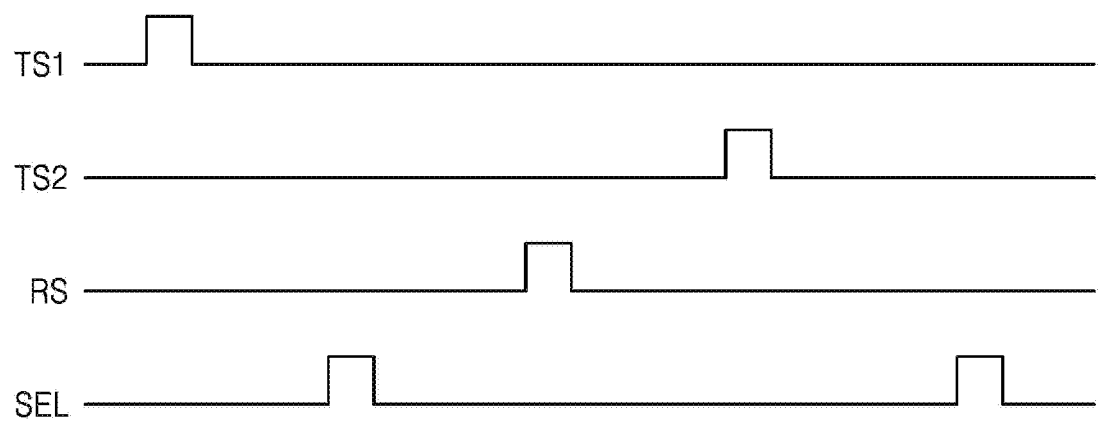
FIG. 6 is a diagram illustrating operation timings of the pixel shown in FIG. 5, according to an embodiment.

FIG. 6 is a diagram illustrating operation timings of the pixel PXa shown in FIG. 5, according to an embodiment.

Referring to FIG. 6, the row driver 120 (refer to FIG. 3) may provide a first transfer control signal TS1, a second transfer control signal TS2, a reset control signal RS, and a selection control signal SEL to the pixel PXa shown in FIG. 5.

In an embodiment, the row driver 120 may provide the first transfer control signal TS1 having an active level at a time point that is different from a time point at which the row driver 120 provides the second transfer control signal TS2 having an active level and may provide the reset control signal RS having an active level between the time of providing the first transfer control signal TS1 having an active level and the time of providing the second transfer control signal TS2 having an active level. In other words, the reset control signal RS having the high level is provided between the first transfer control signal TS1 having the high level and the second transfer control signal TS2 having the high level.

When the row driver 120 (refer to FIG. 3) provides the first transfer control signal TS1 having an active level to the first transfer transistor TX1 (refer to FIG. 5), the first photocharge packet described with reference to FIG. 5 may move to the floating diffusion node FD (refer to FIG. 5), and then, the row driver 120 (refer to FIG. 3) may provide the selection control signal SEL such that a first pixel signal may be read out based on the first photocharge packet.

After the first pixel signal is read out, the row driver 120 (refer to FIG. 3) may provide the reset control signal RS to the reset transistor RX (refer to FIG. 5) to reset the first photocharge packet accumulated in the floating diffusion node FD.

After the first photocharge packet is set, the row driver 120 (refer to FIG. 3) may provide the second transfer control signal TS2 having an active level to the second transfer transistor TX2 (refer to FIG. 5), and then, the second photocharge packet described with reference to FIG. 5 may move to the floating diffusion node FD (refer to FIG. 5). Thereafter, the row driver 120 (refer to FIG. 3) may provide the selection control signal SEL, and then, a second pixel signal may be read out based on the second photocharge packet.

Therefore, the image sensor 100 (refer to FIG. 3) may read out the first pixel signal based on the first photocharge packet and may then read out the second pixel signal based on the second photocharge packet. In other words, two pixel signals may be generated from one pixel PXa (refer to FIG. 5).

Figure 7A:
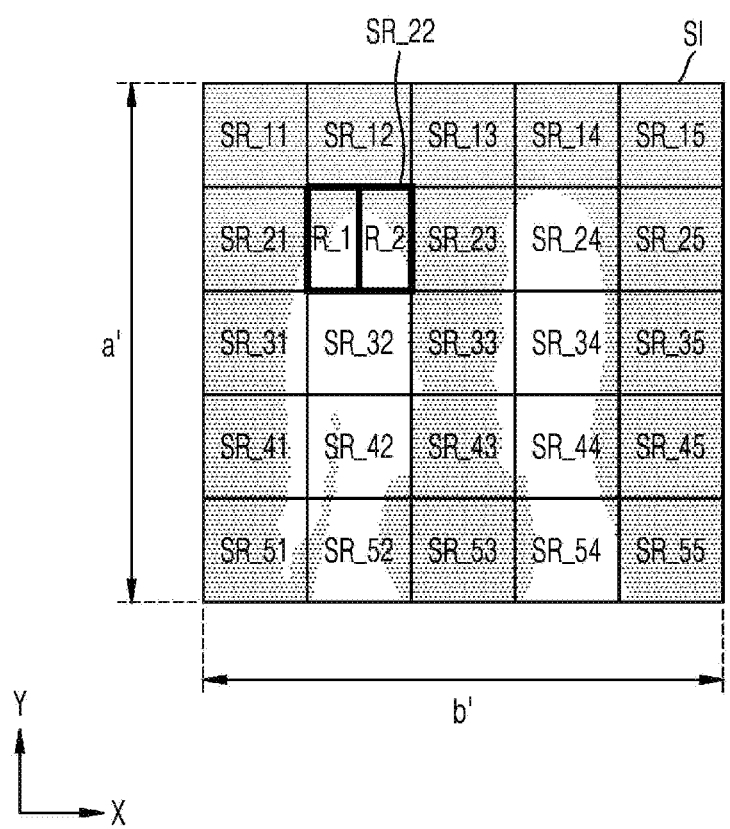
FIG. 7A is a diagram illustrating a squeezed image according to an embodiment.
Figure 7B:
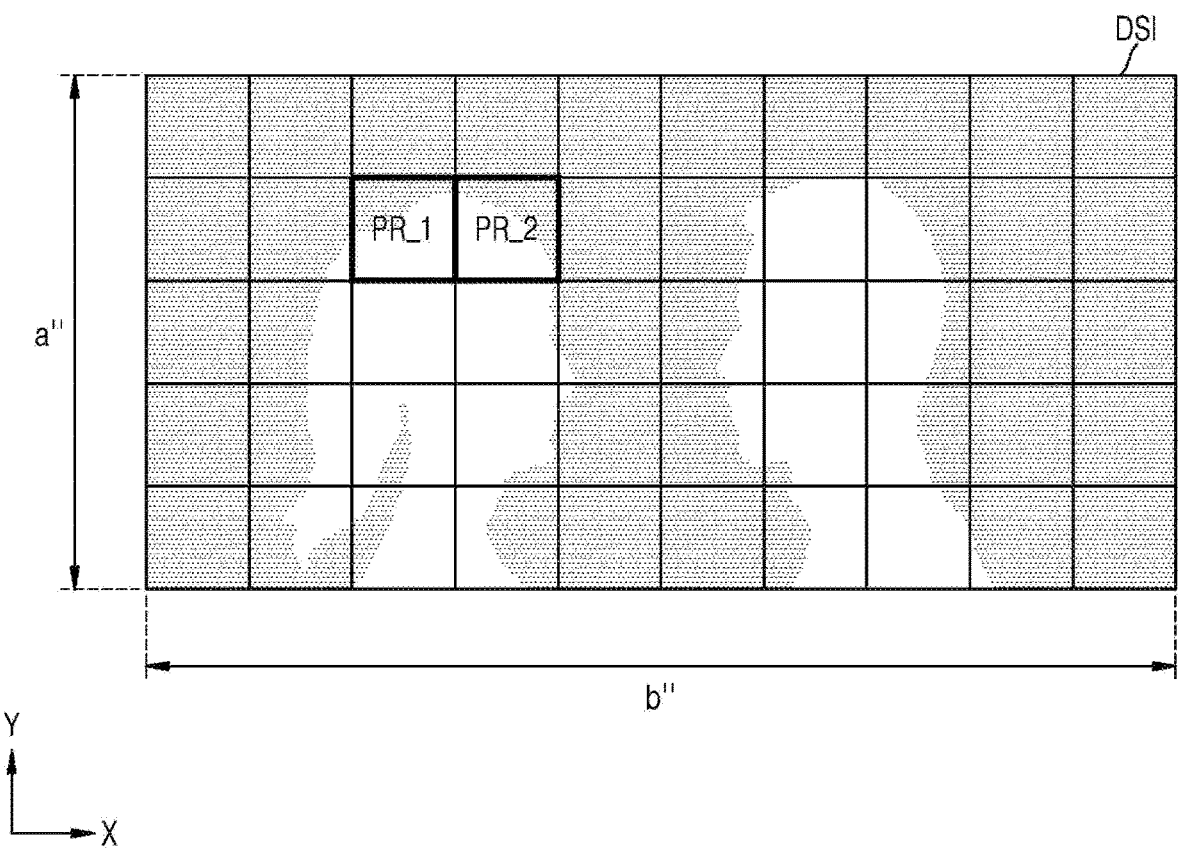
FIG. 7B is a diagram illustrating a final image according to an embodiment.

FIG. 7A is a diagram illustrating a squeezed image SI according to an embodiment, and FIG. 7B is a diagram illustrating a final image DSI according to an embodiment.

FIG. 7A may be described with reference to FIGS. 4A, 4B, and 5, and repeated descriptions thereof may be omitted.

Referring to FIG. 7A, the aspect ratio of the squeezed image SI may be b'/a'. The squeezed image SI may include a plurality of subregions SR_11 to SR_55, and the subregion SR_22 may include a first section R_1 and a second section R_2. In other embodiments, the subregion SR_22 may include more than two sections. The first section R_1 and the second section R_2 may be adjacent to each other in the first direction. For example, a first section and a second section of each subregion may have the same area. In an embodiment, a first section may be the left half of each subregion and a second section may be the right half of each subregion. In the present disclosure, a plurality of sections included in a subregion refer to sections corresponding to photoelectric conversion elements included in each pixel, and the areas and arrangement of sections of a subregion may be defined differently depending on the number and/or arrangement of photoelectric conversion elements included in each pixel.

For ease of illustration, FIG. 7A illustrates that only the subregion SR_22 includes the first section R_1 and the second region R_2. However, like the subregion SR_22, each of the other subregions SR_11 to SR_21 and SR_23 to SR_55 of the squeezed image SI may also have a first section and a second region. The first section and the second section included in each of the other subregions SR_11 to SR_21 and SR_23 to SR_55 may be continuous in the first direction, like the first section R_1 and the second section R_2 of the subregion SR_22. The following description is given based on the subregion SR_22 for ease of description. However, the description given with reference to the subregion SR_22 may also be applied to the other subregions SR_11 to SR_21 and SR_23 to SR_55.

As described above, the subregions SR_11-SR_55 included in the squeezed image SI shown in FIG. 7A may respectively correspond to the pixels PX_11 to PX_55 included in the pixel array 110a shown in FIG. 4B, and each of the pixels PX_11 to PX_55 may have the same structure as the pixel PXa shown in FIG. 5. The pixels PX_11 to PX_55 may receive light corresponding to the subregions SR_11 to SR_55, respectively.

The pixel PX_22 (refer to FIG. 4B) corresponding to the subregion SR_22 of FIG. 7A may receive light corresponding to the subregion SR_22. As described above, the pixel PX_22 (refer to FIG. 4B) may have the same structure as the pixel PXa of FIG. 5. The first photoelectric conversion element PD1 (refer to FIG. 5) may receive light corresponding to the first section R_1 of the subregion SR_22, and the second photoelectric conversion element PD2 (refer to FIG. 5) may receive light corresponding to the second section R_2 of the subregion SR_22. The first photoelectric conversion element PD1 (refer to FIG. 5) may generate a first photocharge packet in response to the received light corresponding to the first section R_1, and the second photoelectric conversion element PD2 (refer to FIG. 5) may generate a second photocharge packet in response to the received light corresponding to the second section R_2. In other words, the first photoelectric conversion element PD1 (refer to FIG. 5) and the second photoelectric conversion element PD2 (refer to FIG. 5) may respectively receive light corresponding to different sections (for example, the first and second sections R_1 and R2) of the subregion SR_22 corresponding to the pixel PX_22 (refer to FIG. 4B) and may generate photocharge packets in response to the received light corresponding to the different sections. As a consequence, the first and second photocharge packets may be different from each other. As described above with reference to FIG. 5, the first photoelectric conversion element PD1 (refer to FIG. 5) and the second photoelectric conversion element PD2 (refer to FIG. 5) may be adjacent to each other in the first direction, and the first section R_1 and the second section R_2 of the subregion SR_22 may be adjacent to each other in the first direction.

Referring to FIG. 7B, the final image DSI may include a first pixel section PR_1 and a second pixel section PR_2.

The first pixel section PR_1 may correspond to a first pixel signal generated based on the first photocharge packet, and the second pixel section PR_2 may correspond to a second pixel signal generated based on the second photocharge packet. The first section R_1 of the subregion SR_22 may correspond to the first pixel section PR_1 of the final image DSI, and the second section R_2 of the subregion SR_22 may correspond to the second pixel section PR_2 of the final image DSI. In this case, because the first section R_1 and the second section R_2 are adjacent to each other in the first direction, the first pixel section PR_1 corresponding to the first section R_1 and the second pixel section PR_2 corresponding to the second section R_2 may be adjacent to each other in the first direction.

In an embodiment, the image sensor 100 (refer to FIG. 3) may capture the squeezed image SI including the subregions SR_11-SR_55 and may generate two pixel sections (for example, the first and second pixel sections PR_1 and PR_2) from one subregion (for example, the subregion SR_22). The two pixel sections (for example, the first and second pixel sections PR_1 and PR_2) may be adjacent to each other in the first direction. Therefore, the image sensor 100 (refer to FIG. 3) may generate the final image DSI including a first pixel section and a second pixel section that are adjacent to each other in the first direction and are generated from each of the subregions SR_11 to SR_55 of the squeezed image SI. The aspect ratio of the final image DSI may be greater than the aspect ratio of the image sensor 100 (refer to FIG. 3) and the aspect ratio of the squeezed image SI. For example, when the aspect ratio of the subregion SR_22 is equal to each of the aspect ratio of the first pixel section PR_1 and the aspect ratio of the second pixel section PR_2, the image sensor 100 (refer to FIG. 3) may generate two pixel sections (for example, the first and second pixel sections PR_1 and PR_2) that are adjacent to each other in the first direction and correspond to one subregion (for example, the subregion SR_22) of the squeezed image SI of FIG. 7A, and thus, the aspect ratio of the sum of the first pixel section PR_1 and the second pixel section PR_2 may be twice the aspect ratio of the subregion SR_22. Consequently, b"/a", i.e., the aspect ratio of the final image DSI, may be twice b'/a'. In embodiments, however, the ratio of the aspect ratio of a final image and the aspect ratio of a squeezed image is not limited thereto.

In embodiments, the image sensor 100 (refer to FIG. 3) may capture a real image (for example, the real image RI shown in FIG. 2) having an aspect ratio greater than the aspect ratio of the image sensor 100 (refer to FIG. 3) by squeezing the real image using the lens 11 (refer to FIG. 2). Each of the pixels PX (refer to FIG. 3) may include at least two photoelectric conversion elements (for example, the first and second photoelectric conversion elements PD1 and PD2 shown in FIG. 5) that are consecutive in the first direction, and pixel signals may be read out based on photocharge packets respectively regenerated by the photoelectric conversion elements. Therefore, the image sensor 100 (refer to FIG. 3) may generate the final image DSI having an aspect ratio greater than the aspect ratio of the image sensor 100 (refer to FIG. 3) and the aspect ratio of the squeezed image SI without having to additionally de-squeeze the squeezed image SI after capturing the squeezed image SI. In other words, the image sensor 100 can generate the final image DSI with an aspect ratio larger than both the aspect ratio of the image sensor 100 and the squeezed image SI. This can be achieved without the need for additional de-squeezing of the squeezed image SI after it has been captured.

Figure 8:
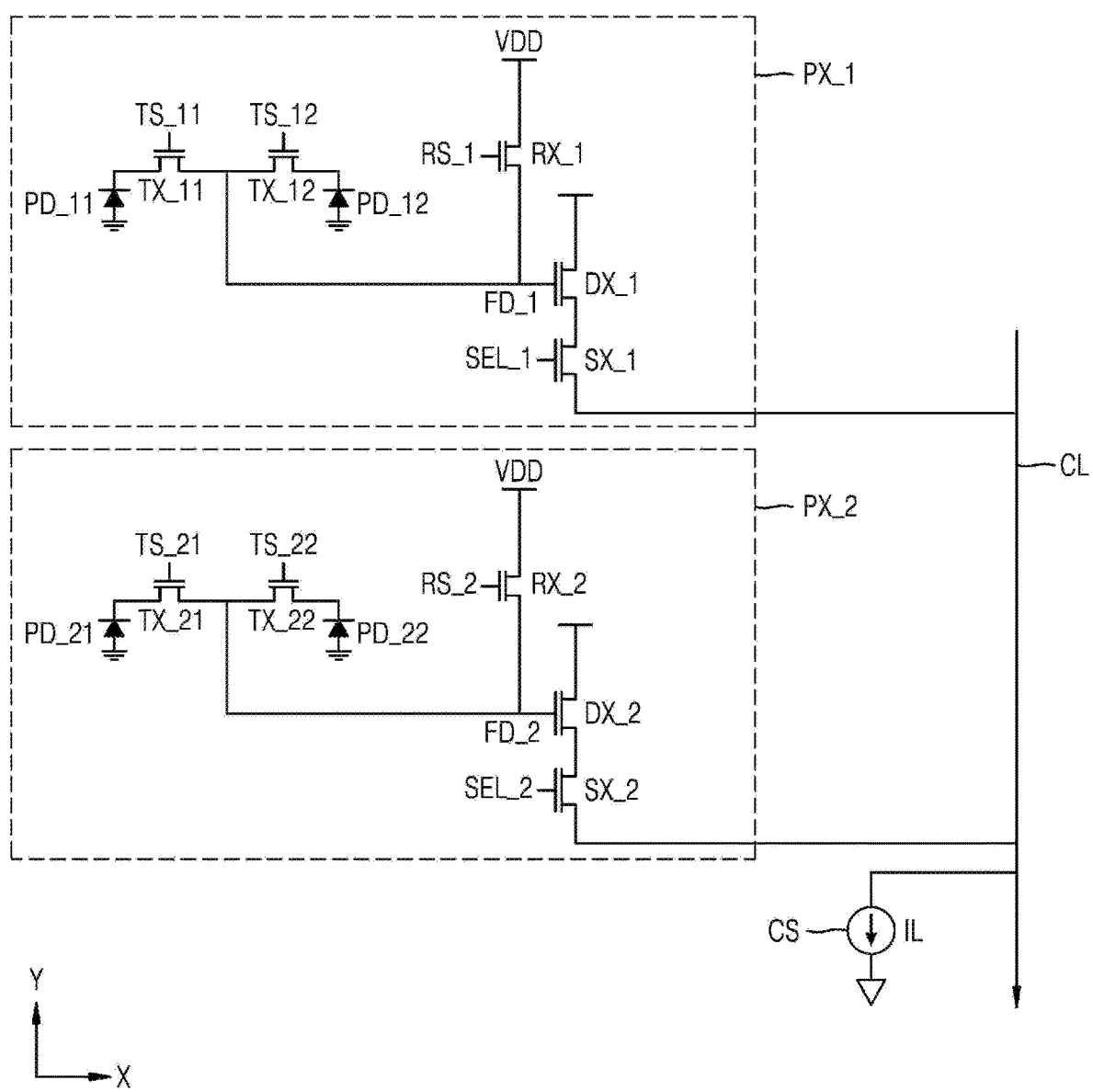
FIG. 8 is a circuit diagram illustrating a first pixel and a second pixel according to an embodiment.

FIG. 8 is a circuit diagram illustrating a first pixel PX_1 and a second pixel PX_2 according to an embodiment.

FIG. 8 may be described with reference to FIG. 5, and repeated descriptions thereof may be omitted.

Referring to FIG. 8, the first pixel PX_1 may include a first photoelectric conversion element PD_11, a second photoelectric conversion element PD_12, a first transfer transistor TX_11, a second transfer transistor TX_12, a reset transistor RX_1, a driving transistor DX_1, and a selection transistor SX_1. The second pixel PX_2 may include a first photoelectric conversion element PD_21, a second photoelectric conversion element PD_22, a first transfer transistor TX_21, a second transfer transistor TX_22, a reset transistor RX_2, a driving transistor DX_2, and a selection transistor SX_2.

The first pixel PX_1 and the second pixel PX_2 may be adjacent pixels in the second direction, and the transistors included in the first pixel PX_1 and the second pixel PX_2 may operate in response to control signals provided from the row driver 120 (refer to FIG. 3).

Because the first pixel PX_1 and the second pixel PX_2 are adjacent pixels in the second direction, subregions corresponding to the first pixel PX_1 and the second pixel PX_2 may be adjacent to each other in the second direction.

In an embodiment, at a first time point, the row driver 120 (refer to FIG. 3) may transmit first transfer control signals TS_11 and TS_21 having active levels to the first transfer transistors TX_11 and TX_21 respectively included in the first pixel PX_1 and the second pixel PX_2, and at a second time point, the row driver 120 (refer to FIG. 3) may transmit second transfer control signals TS_12 and TS_22 having active levels to the second transfer transistors TX_12 and TX_22 respectively included in the first pixel PX_1 and the second pixel PX_2. Therefore, at the first time point, a photocharge packet generated by the first photoelectric conversion element PD_11 of the first pixel PX_1 may move to a floating diffusion node FD_1, and a photocharge packet generated by the first photoelectric conversion element PD_21 of the second pixel PX_2 may move to a floating diffusion node FD_2. In other words, at the first time point the floating diffusion node FD_1 may include a first photocharge packet of the first pixel PX_1 and the floating diffusion node FD_2 may include a first photocharge packet of the second pixel PX_2. Thereafter, the row driver 120 (refer to FIG. 3) may provide selection control signals SEL_1 and SEL_2 having active levels respectively to the selection transistor SX_1 of the first pixel PX_1 and the selection transistor SX_2 of the second pixel PX_2. Therefore, a pixel signal generated based on the photocharge packet generated by the first photoelectric conversion element PD_11 and a pixel signal generated based on the photocharge packet generated by the first photoelectric conversion element PD_21 may be simultaneously output through a column line CL. In this case, a pixel signal having a relatively high voltage among the two pixel signals may be provided to the readout circuit 130 (refer to FIG. 3) through the column line CL.

Similarly, at the second time point, a photocharge packet generated by the second photoelectric conversion element PD_12 of the first pixel PX_1 may move to the floating diffusion node FD_1, and a photocharge packet generated by the second photoelectric conversion element PD_22 of the second pixel PX_2 may move to the floating diffusion node FD_2. In other words, at the second time point the floating diffusion node FD_1 may include a second photocharge packet of the first pixel PX_1 and the floating diffusion node FD_2 may include a second photocharge packet of the second pixel PX_2. Thereafter, the row driver 120 (refer to FIG. 3) may provide selection control signals having active levels SEL_1 and SEL_2 respectively to the selection transistor SX_1 of the first pixel PX_1 and the selection transistor SX_2 of the second pixel PX_2. Therefore, a pixel signal generated based on the photocharge packet generated by the second photoelectric conversion element PD_12 and a pixel signal generated based on the photocharge packet generated by the second photoelectric conversion element PD_22 may be simultaneously output through the column line CL. In this case, a pixel signal having a relatively high voltage among the two pixel signals may be provided to the readout circuit 130 (refer to FIG. 3) through the column line CL.

Therefore, two pixel signals may be provided to the readout circuit 130 (refer to FIG. 3) from the first pixel PX_1 and the second pixel PX_2 that are consecutive in the second direction.

Figure 9A:
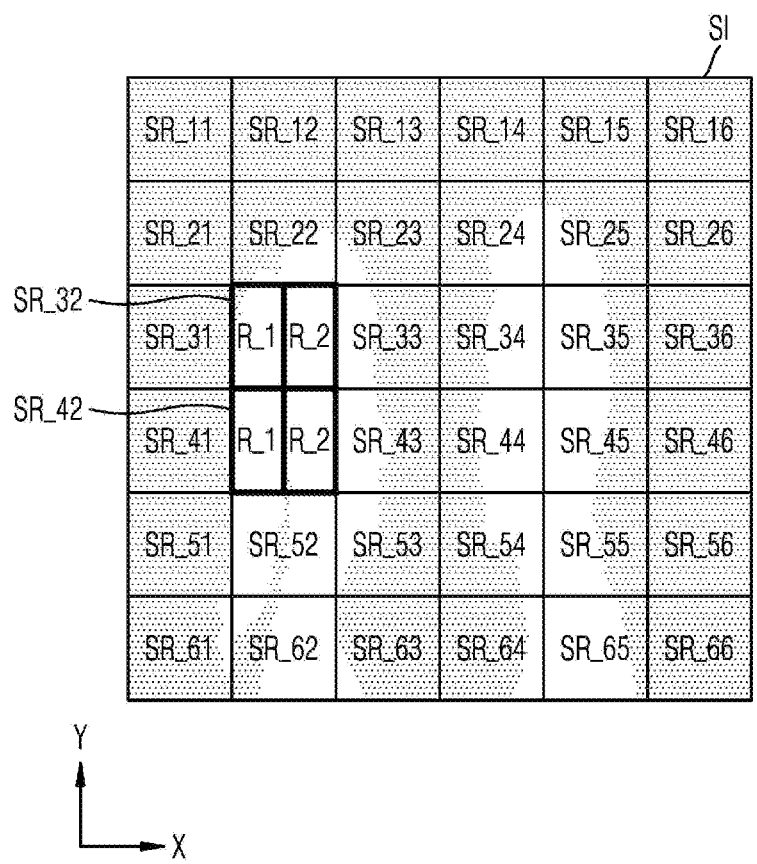
FIG. 9A is a diagram illustrating a squeezed image according to an embodiment.
Figure 9B:
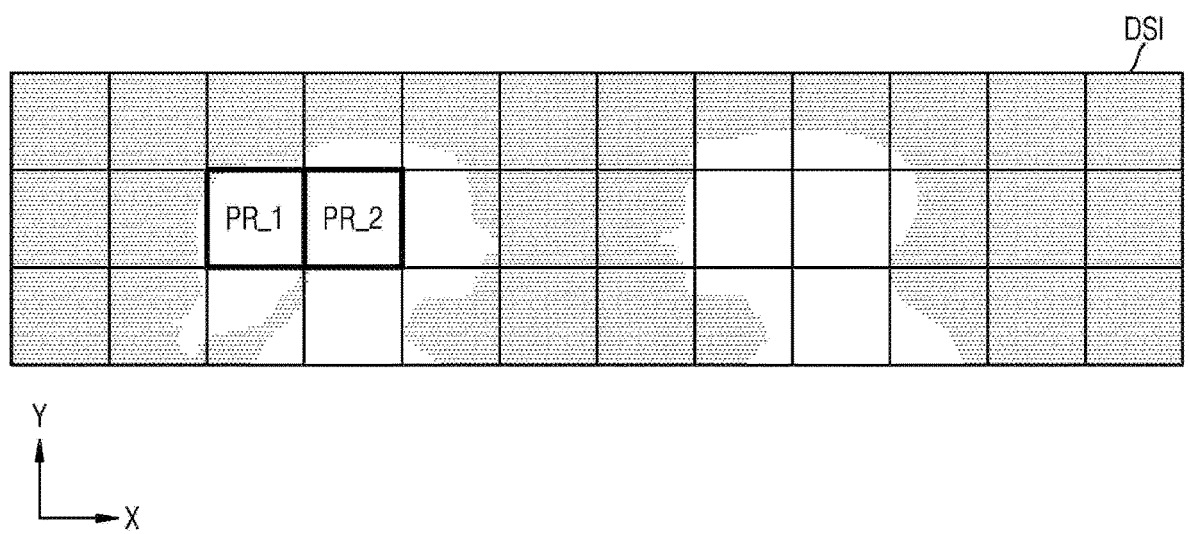
FIG. 9B is a diagram illustrating a final image according to an embodiment.

FIG. 9A is a diagram illustrating a squeezed image SI according to an embodiment, and FIG. 9B is a diagram illustrating a final image DSI according to an embodiment.

FIGS. 9A and 9B may be described with reference to FIG. 8.

Referring to FIG. 9A, the squeezed image SI may include a plurality of subregions SR_11 to SR_66 (i.e., SR_11 to SR_16, SR_21 to SR_26, SR_31 to SR_36, SR_41 to SR_46, SR_51 to SR_56, and SR_61 to SR_66). The subregion SR_32 may include a first section R_1 and a second section R_2, and the subregion SR_42 may include a first section R_1 and a second section R_2. In this case, the subregion SR_32 and the subregion SR_42 may be adjacent to each other in the second direction, and the first section R_1 and the second section R_2 included in each of the subregions SR_32 and SR_42 may be adjacent to each other in the first direction. For example, a first section and a second section of each subregion may have the same area. In an embodiment, a first section may be the left half of each subregion and a second section may be the right half of each subregion.

For ease of illustration, FIG. 9A illustrates that only the subregions SR_32 and SR_42 include the first sections R_1 and the second regions R_2. However, like the subregion SR_32 and SR_42, each of the other subregions SR_11 to SR_31, SR_33 to SR_41, and SR_43 to SR_66 may also include a first section R_1 and a second region R_2. The following description is given based on the subregions SR_32 and SR_42 for ease of description. However, descriptions given with reference to the subregions SR_32 and SR_42 may also be applied to the other subregions SR_11 to SR_31, SR_33 to SR_41, and SR_43 to SR_66.

As described above, the first pixel PX_1 and the second pixel PX_2 shown in FIG. 8 may be adjacent to each other in the second direction, and the first pixel PX_1 and the second pixel PX_2 may respectively correspond to subregions adjacent to each other in the second direction.

Referring to FIGS. 8 and 9A, the first pixel PX_1 shown in FIG. 8 may correspond to the subregion SR_32 of the squeezed image SI shown in FIG. 9A, and the second pixel PX_2 shown in FIG. 8 may correspond to the subregion SR_42 of the squeezed image SI shown in FIG. 9A. Here, the first photoelectric conversion element PD_11 included in the first pixel PX_1 may correspond to the first section R_1 included in the subregion SR_32, and a photocharge packet may be generated in response to incident light corresponding to the first section R_1. The second photoelectric conversion element PD_12 included in the first pixel PX_1 may correspond to the second section R_2 included in the subregion SR_32, and a photocharge packet may be generated in response to incident light corresponding to the second section R_2. The photocharge packets corresponding to the first and second sections R_1 and R_2 of the first pixel PX_1 may be provided to the floating diffusion node FD_1. The first photoelectric conversion element PD_21 included in the second pixel PX_2 may correspond to the first section R_1 included in the subregion SR_42, and a photocharge packet may be generated in response to incident light corresponding to the first section R_1. The second photoelectric conversion element PD_22 included in the second pixel PX_2 may correspond to the second section R_2 included in the subregion SR_42, and a photocharge packet may be generated in response to incident light corresponding to the second section R_2. The photocharge packets corresponding to the first and second sections R_1 and R_2 of the second pixel PX_2 may be provided to the floating diffusion node FD_2.

Referring to the description given with reference to FIG. 8, a pixel signal generated based on the photocharge packet generated by the first photoelectric conversion element PD_11 included in the first pixel PX_1, and a pixel signal generated based on the photocharge packet generated by the first photoelectric conversion element PD_21 included in the second pixel PX_2 may be output through the column line CL (refer to FIG. 8) according to control signals provided by the row driver 120 (refer to FIG. 3). In this case, a pixel signal (e.g., a first pixel signal) having a relatively high voltage among the two pixel signals may be provided to the readout circuit 130 (refer to FIG. 3). Similarly, a pixel signal generated based on the photocharge packet generated by the second photoelectric conversion element PD_12 included in the first pixel PX_1, and a pixel signal generated based on the photocharge packet generated by the second photoelectric conversion element PD_22 included in the second pixel PX_2 A may be output through the column line CL (refer to FIG. 8). In this case, a pixel signal (e.g., a second pixel signal) having a relatively high voltage among the two pixel signals may be provided to the readout circuit 130 (refer to FIG. 3).

Therefore, the first pixel signal and the second pixel signal may be provided to the readout circuit 130 (refer to FIG. 3) from the first pixel PX_1 and the second pixel PX_2 that are consecutive in the second direction.

Referring to FIG. 9B, the final image DSI may include a first pixel section PR_1 and a second pixel section PR_2.

The first pixel section PR_1 may correspond to a pixel signal having a relatively high voltage among the pixel signal generated based on the photocharge packet generated by the first photoelectric conversion element PD_11 of the first pixel PX1 and the pixel signal generated based on the photocharge packet generated by the first photoelectric conversion element PD_21 of the second pixel PX_2. The second pixel section PR_2 may correspond to a pixel signal having a relatively high voltage among the pixel signal generated based on the photocharge packet generated by the second photoelectric conversion element PD_12 of the first pixel PX1 and the pixel signal generated based on the photocharge packet generated by the second photoelectric conversion element PD_22 of the second pixel PX_2.

Therefore, the image sensor 100 (refer to FIG. 3) of the inventive concept may receive light corresponding to the subregions SR_32 and SR_42 adjacent to each other in the second direction through the first pixel PX_1 and the second pixel PX_2 adjacent to each other in the second direction as shown in FIG. 8. Consequently, the image sensor 100 (refer to FIG. 3) may generate the first pixel section PR_1 and the second pixel section PR_2 that are adjacent to each other in the first direction. Therefore, the aspect ratio of the final image DSI may be greater than the aspect ratio of the image sensor 100 (refer to FIG. 3) and the aspect ratio of the squeezed image SI. For example, when the subregion SR_32, the subregion SR_42, the first pixel section PR_1, and the second pixel section PR_2 have the same aspect ratio, the image sensor 100 (refer to FIG. 3) may generate the first pixel section PR_1 of the final image DSI based on the first section R_1 of the subregion SR_32 and the first section R_1 of the subregion SR_42 that are included in the squeezed image SI shown in FIG. 9A and may generate the second pixel section PR_2 of the final image DSI based on the second section R_2 of the subregion SR_32 and the second section R_2 of the subregion SR_42 that are included in the squeezed image SI shown in FIG. 9A. In addition, the subregion SR_32 and the subregion SR_42 may be adjacent to each other in the second direction, and the first pixel section PR_1 and the second pixel section PR_2 may be adjacent to each other in the first direction perpendicular to the second direction. Therefore, because the first and second pixel sections PR_1 and PR_2 adjacent to each other in the first direction may be generated corresponding to the sub-regions SR_32 and SR_42 adjacent to each other in the second direction, the aspect ratio of the sum of the first and second pixel sections PR_1 and PR_2 (e.g., two pixel sections) adjacent to each other in the first direction may be four times the aspect ratio of the sum of the subregions SR_32 and SR_42 (e.g., two subregions) adjacent to each other in the second direction. In other words, the aspect ratio of the combined first and second pixel sections PR_1 and PR_2 (adjacent in the first direction) is four times the aspect ratio of the combined subregions SR_32 and SR_42 (adjacent in the second direction). As a result, the aspect ratio of the final image DSI may be four times the aspect ratio of the squeezed image SI.

In this case, a lens used to generate the squeezed image SI shown in FIG. 9A may squeeze a real image in the first direction more than a lens used to generate the squeezed image SI shown in FIG. 7A. In other words, when the aspect ratio of the squeezed image SI shown in FIG. 9A is equal to the aspect ratio of the squeezed image SI shown in FIG. 7A, the field of view of the lens used to generate the squeezed image SI shown in FIG. 9A may be greater than the field of view of the lens used to generate the squeezed image SI shown in FIG. 7A.

Therefore, the image sensor 100 (refer to FIG. 3) may capture a real image (for example, the real image RI shown in FIG. 2) having an aspect ratio that is greater than the aspect ratio of the image sensor 100 (refer to FIG. 3) by squeezing the real image using a lens (for example, the lens 11 shown in FIG. 2) and may generate a final image DSI having an aspect ratio that is greater than the aspect ratio of the image sensor 100 (refer to FIG. 3) and the aspect ratio of a squeezed image SI without an additional de-squeezing process.

Figure 10:
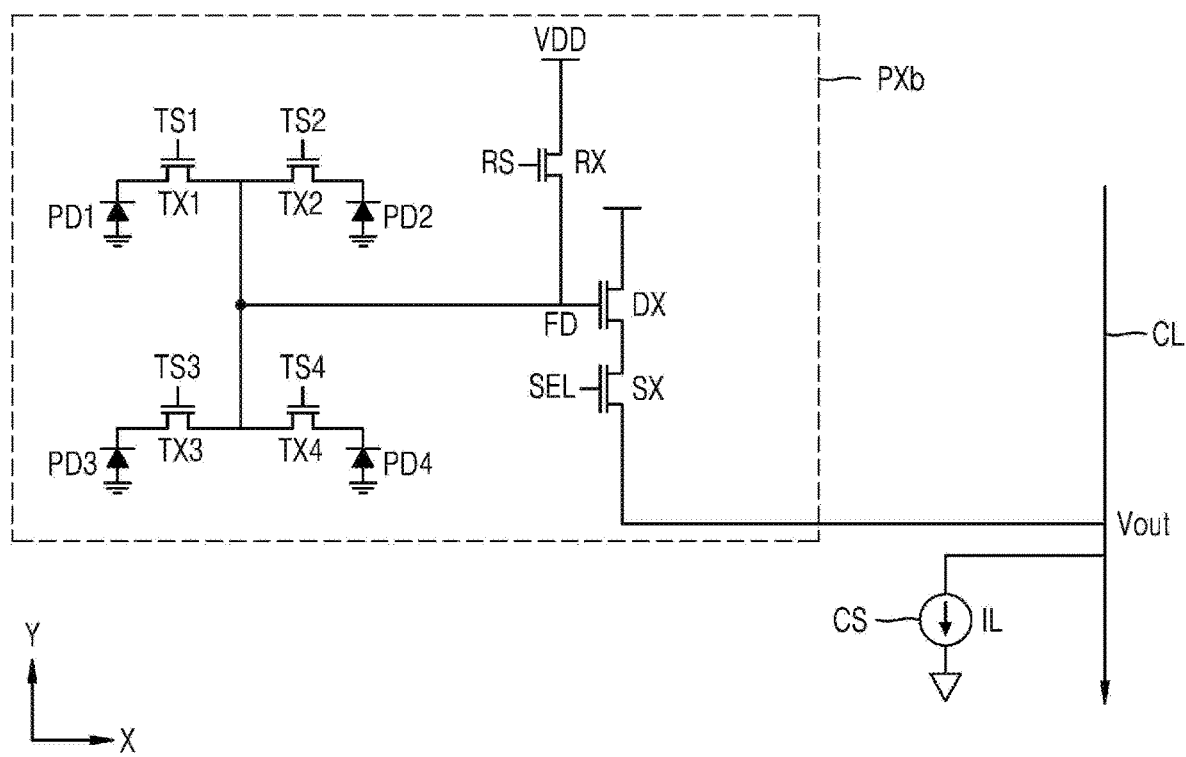
FIG. 10 is a circuit diagram illustrating a pixel according to an embodiment.

FIG. 10 is a circuit diagram illustrating a pixel PXb according to an embodiment.

FIG. 10 may be described with reference to FIG. 5, and repeated descriptions thereof may be omitted.

Referring to FIG. 10, the pixel PXb of the embodiment may include a first photoelectric conversion element PD1, a second photoelectric conversion element PD2, a third photoelectric conversion element PD3, a fourth photoelectric conversion element PD4, a first transfer transistor TX1, a second transfer transistor TX2, a third transfer transistor TX3, a fourth transfer transistor TX4, a reset transistor RX, a driving transistor DX, and a selection transistor SX.

The first photoelectric conversion element PD1, the second photoelectric conversion element PD2, the third photoelectric conversion element PD3, and the fourth photoelectric conversion element PD4 of the pixel PXb may be arranged in a 2×2 matrix. For example, the first photoelectric conversion element PD1 and the second photoelectric conversion element PD2 may be adjacent to each other in the first direction, and the first photoelectric conversion element PD1 and the third photoelectric conversion element PD3 may be adjacent to each other in the second direction.

The first photoelectric conversion element PD1, the second photoelectric conversion element PD2, the third photoelectric conversion element PD3, and the fourth photoelectric conversion element PD4 of the pixel PXb may be connected to one floating diffusion node FD. In other words, the first photoelectric conversion element PD1, the second photoelectric conversion element PD2, the third photoelectric conversion element PD3, and the fourth photoelectric conversion element PD4 may share one floating diffusion node FD.

The first transfer transistor TX1, the second transfer transistor TX2, the third transfer transistor TX3, the fourth transfer transistor TX4, the reset transistor RX, the driving transistor DX, and the selection transistor SX may operate in response to control signals provided from the row driver 120 (refer to FIG. 3), such as a first transfer control signal TS1, a second transfer control signal TS2, a third transfer control signal TS3, a fourth transfer control signal TS4, a reset control signal RS, and a selection control signal SEL.

In an embodiment, the row driver 120 (refer to FIG. 3) may simultaneously provide the first transfer control signal TS1 having an active level and the third transfer control signal TS3 having an active level and may simultaneously provide the second transfer control signal TS2 having an active level and the fourth transfer control signal TS4 having an active level. In other words, according to the operation of the row driver 120 (refer to FIG. 3), photocharge packets respectively generated by photoelectric conversion elements adjacent to each other in the second direction may be simultaneously transferred to the floating diffusion node FD and added together in the floating diffusion node FD.

Therefore, a photocharge packet generated by the first photoelectric conversion element PD1 and a photocharge packet generated by the third photoelectric conversion element PD3 may move to the floating diffusion node FD and merge together in the floating diffusion node FD as a first photocharge packet, and a pixel signal may be generated by the pixel PXb based on the first photocharge packet. Similarly, photocharge packets respectively generated by the second photoelectric conversion element PD2 and the fourth photoelectric conversion element PD4 may simultaneously move to the floating diffusion node FD and merge together in the floating diffusion node FD as a second photocharge packet, and a second pixel signal may be generated by the pixel PXb based on the second photocharge packet. The first pixel signal and the second pixel signal may be provided to the readout circuit 130 (refer to FIG. 3) through a column line CL at different timings.

Figure 11A:
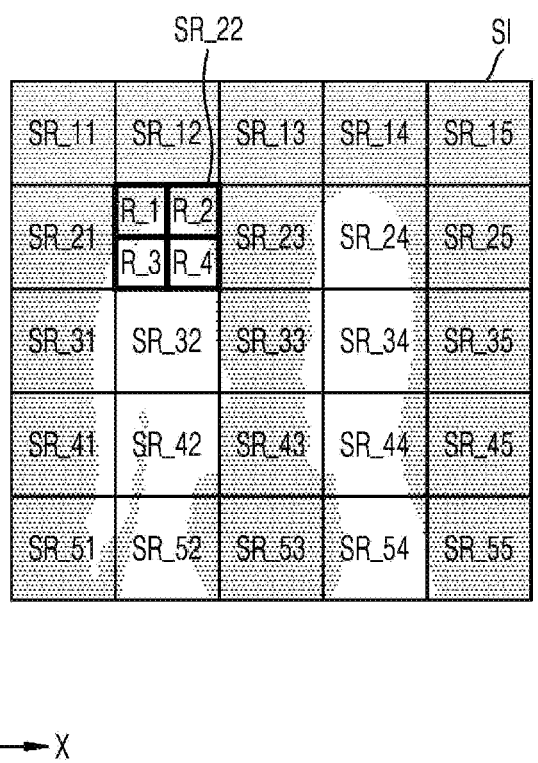
FIG. 11A is a diagram illustrating a squeezed image according to an embodiment.
Figure 11B:
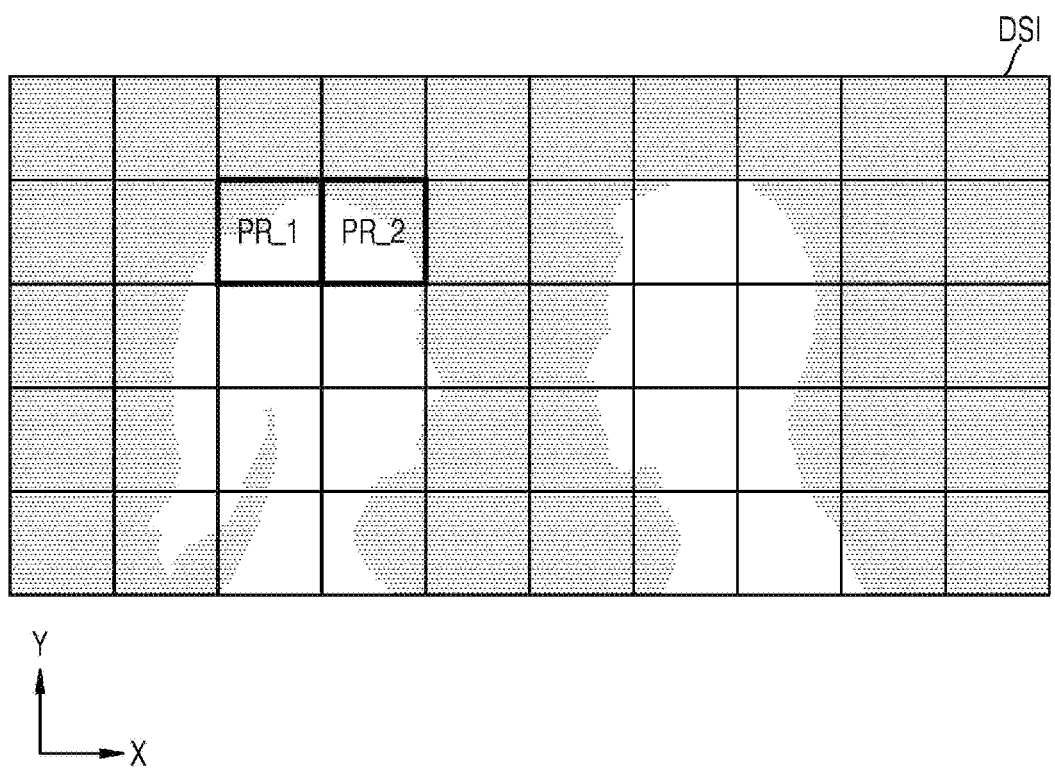
FIG. 11B is a diagram illustrating a final image according to an embodiment.

FIG. 11A is a diagram illustrating a squeezed image SI according to an embodiment, and FIG. 11B is a diagram illustrating a final image DSI according to an embodiment.

FIGS. 11A and 11B may be described with reference to FIG. 10.

Referring to FIG. 11A, the squeezed image SI may include a plurality of subregions SR_11 to SR_55, and the subregion SR_22 may include a first section R_1, a second section R_2, a third section R_3, and a fourth section R_4. The first section R_1, the second section R_2, the third section R_3, and the fourth section R_4 may be arranged in a 2×2 matrix. For example, the first section R_1 may be adjacent to the second section R_2 in the first direction, and the first section R_1 may be adjacent to the third section R_3 in the second direction. For ease of illustration, FIG. 11A illustrates that only the subregion SR_22 includes the first section R_1, the second section R_2, the third section R_3, and the fourth section R_4. However, each of the other subregions SR_11 to SR_21 and SR_23 to SR_55 may also include a first section, a second section, a third section, and a fourth section.

Referring to FIGS. 10 and 1/ A, the pixel PXb shown in FIG. 10 may correspond to the subregion SR_22 shown in FIG. 11A. The pixel PXb may receive light corresponding to the subregion SR_22. The first photoelectric conversion element PD1 included in the pixel PXb may correspond to the first section R_1 included in the subregion SR_22, the second photoelectric conversion element PD2 included in the pixel PXb may correspond to the second section R_2 included in the subregion SR_22, the third photoelectric conversion element PD3 included in the pixel PXb may correspond to the third section R_3 included in the subregion SR_22, and the fourth photoelectric conversion element PD4 included in the pixel PXb may correspond to the fourth section R_4 included in the subregion SR_22. Therefore, the first photoelectric conversion element PD1 may generate a photocharge packet in response to incident light corresponding to the first section R_1, the second photoelectric conversion element PD2 may generate a photocharge packet in response to incident light corresponding to the second section R_2, the third photoelectric conversion element PD3 may generate a photocharge packet in response to incident light corresponding to the third section R_3, and the fourth photoelectric conversion element PD4 may generate a photocharge packet in response to incident light corresponding to the fourth section R_4.

As described with reference to FIG. 10, according to the operation of the row driver 120 (refer to FIG. 3), the photocharge packets generated in the first photoelectric conversion element PD1 and the third photoelectric conversion element PD3 may be simultaneously transferred to the floating diffusion node FD, and a first pixel signal generated based on a first photocharge packet, which is the sum of the photocharge packet generated by the first photoelectric conversion element PD1 and the photocharge packet generated by the third photoelectric conversion element PD3, may be output through the column line CL (refer to FIG. 10). Similarly, the photocharge packets generated by the second photoelectric conversion element PD2 and the fourth photoelectric conversion element PD4 may be simultaneously transferred to the floating diffusion node FD, and a second pixel signal based on a second photocharge packet, which is the sum of the photocharge packet generated by the second photoelectric conversion element PD2 and the photocharge packet generated by the fourth photoelectric conversion element PD4, may be output through the column line CL (refer to FIG. 10).

Referring to FIG. 11B, the final image DSI may include a first pixel section PR_1 and a second pixel section PR_2. The first pixel section PR_1 may correspond to the first pixel signal generated based on the first photocharge packet described with reference to FIGS. 11A and 10. Similarly, the second pixel section PR_2 may correspond to the second pixel signal generated based on the second photocharge packet described with reference to FIGS. 11A and 10. Therefore, the image sensor 100 (refer to FIG. 3) may generate the final image DSI, which includes the first pixel section PR_1 and the second pixel section PR_2 adjacent to each other in the first direction based on the subregion SR_22 corresponding to the pixel PXb through the photoelectric conversion elements included in the pixel PXb and arranged in a 2×2 matrix. As a consequence, the aspect ratio of the final image DSI may be greater than the aspect ratio of the image sensor 100 (refer to FIG. 3) and the aspect ratio of the squeezed image SI. For example, the image sensor 100 (refer to FIG. 3) may generate the first and second pixel sections PR_1 and PR_2 (e.g., two pixel sections) that are adjacent to each other in the first direction and correspond to the subregion SR_22 of the squeezed image SI shown in FIG. 11A. In other words, as described above, the image sensor 100 (refer to FIG. 3) may generate, from the subregion SR_22, two pixel signals (for example, the first and second pixel signals) each based on the sum of photocharge packets generated by photoelectric conversion elements (for example, the first and third photoelectric conversion elements PD1 and PD3) adjacent to each other in the second direction and may then generate the first pixel section PR_1 corresponding to the first pixel signal and the second pixel section PR_2 corresponding to the second pixel signal. When the aspect ratio of the sub area SR_22 is equal to the aspect ratio of each of the first and second pixel sections PR_1 and PR_2, the aspect ratio of the sum of the first pixel section PR_1 and the second pixel section PR_2 may be twice the aspect ratio of the subregion SR_22. Therefore, the aspect ratio of the final image DIS may be twice the aspect ratio of the squeezed image SI.

Therefore, the image sensor 100 (refer to FIG. 3) may capture a real image (for example, the real image RI shown in FIG. 2) having an aspect ratio that is greater than the aspect ratio of the image sensor 100 (refer to FIG. 3) by squeezing the real image using a lens (for example, the lens 11 shown in FIG. 2) and may generate a final image DSI having an aspect ratio that is greater than the aspect ratio of the image sensor 100 (refer to FIG. 3) and the aspect ratio of a squeezed image SI without an additional de-squeezing process.

Figure 12:
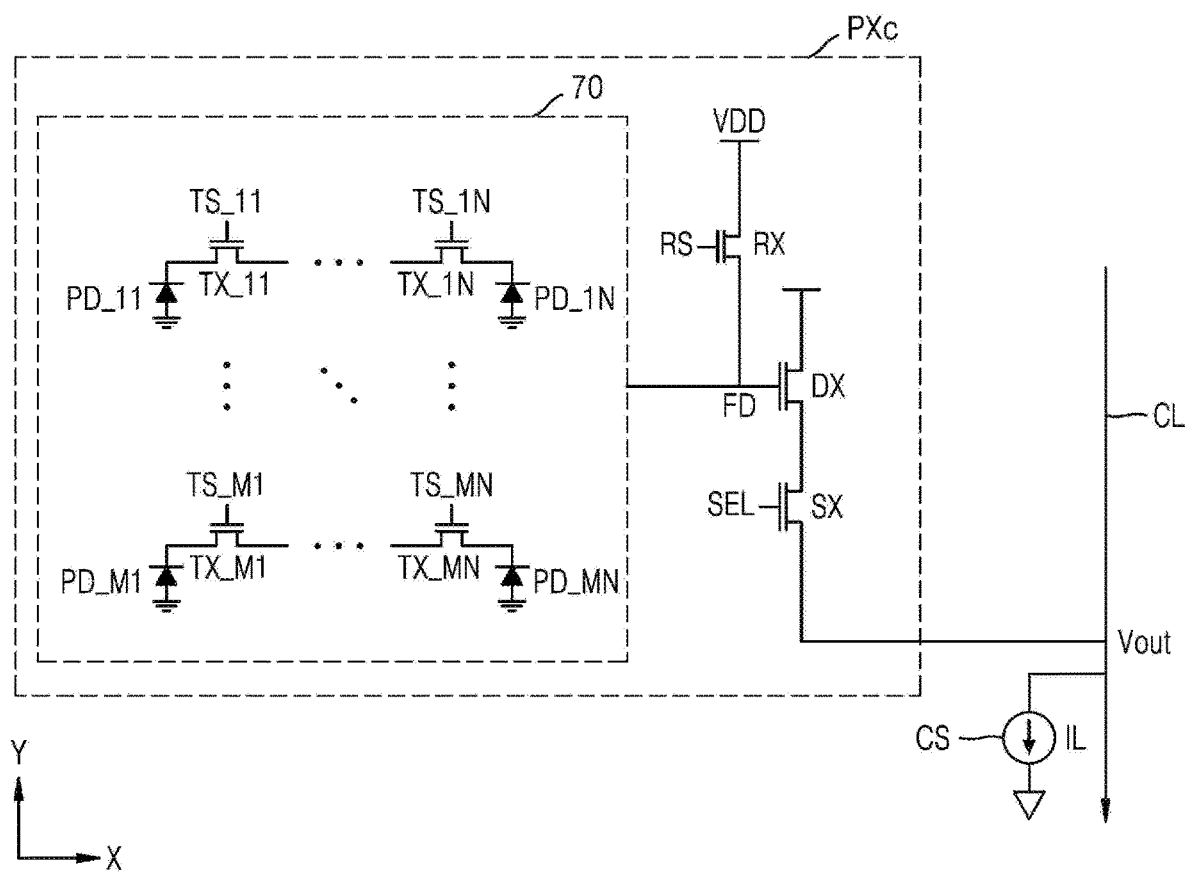
FIG. 12 is a circuit diagram illustrating a pixel according to an embodiment.

FIG. 12 is a circuit diagram illustrating a pixel PXc according to an embodiment.

FIG. 12 may be described with reference to FIG. 5, and repeated descriptions thereof may be omitted.

Referring to FIG. 12, the pixel PXc of the embodiment may include a pixel circuit 70, a reset transistor RX, a driving transistor DX, and a selection transistor SX. The pixel circuit 70 may include: M*N photoelectric conversion elements PD_11 to PD_MN arranged in an M×N matrix; and M*N transfer transistors TX_11 to TX_MN respectively connected to the M*N photoelectric conversion elements PD_11 to PD_MN. The M*N photoelectric conversion elements PD_11 to PD_MN arranged in an M×N matrix may be connected to one floating diffusion node FD. M and N may each be an integer greater than or equal to 2. For example, when M and N are each 2, the pixel PXc may have the same structure as the pixel PXb shown in FIG. 10.

In an embodiment, the row driver 120 (refer to FIG. 3) may simultaneously provide transfer control signals (for example, transfer control signals TS_11 to TS_M1) having active levels to transfer transistors (for example, the transfer transistors TX_11 to TX_M1) that are connected to M photoelectric conversion elements (for example, the photoelectric conversion elements PD_11 to PD_M1) sequentially arranged in the second direction. Therefore, photocharge packets generated from the M photoelectric conversion elements (for example, the photoelectric conversion elements PD_11 to PD_M1) may move to the floating diffusion node FD and merge in the floating diffusion node, and the image sensor 100 (refer to FIG. 3) may generate a pixel signal from the pixel PXc based on the merged photocharge packets. Because the pixel PXc includes N groups each including M photoelectric conversion elements continuously arranged in the second direction, the image sensor 100 (refer to FIG. 3) may generate a total of N pixel signals from the pixel PXc according to the method described above.

As described above, the image sensor 100 (refer to FIG. 3) may photograph a subregion corresponding to the pixel PXc by using the PXc, and the M*N photoelectric conversion elements PD_11 to PD_MN of the pixel PXc arranged in an M×N matrix may respectively generate photocharge packets in response to incident light corresponding to sections of the subregion. In this case, one pixel signal may be generated based on the sum of M photocharge packets generated by each of M photoelectric conversion elements continuously arranged in the second direction, and thus, a total of N pixel signals may be generated. Each of the N pixel signals may respectively correspond to N pixel sections of a final image that are continuous in the first direction. Therefore, the image sensor 100 (refer to FIG. 3) may generate a final image having an aspect ratio that is greater than the aspect ratio of a squeezed image without additional de-squeezing.

For example, the image sensor 100 (refer to FIG. 3) may generate N pixel sections that are adjacent to each other in the first direction and correspond to one subregion of a squeezed image SI. In other words, as described above, the image sensor 100 (refer to FIG. 3) may generate, from one subregion, N pixel signals each based on the sum of photocharge packets generated by each group of photoelectric conversion elements adjacent to each other in the second direction among M*N photoelectric conversion elements PD_11 to PD_MN of each pixel, and may generate N pixel sections corresponding to the N pixel signals. When the aspect ratio of the subregion is equal to the aspect ratio of each of the N pixel sections, the aspect ratio of the sum of the N pixel sections may be N times the aspect ratio of the subregion (for example, the subregion SR_22). Therefore, the aspect ratio of a final image DIS may be N times the aspect ratio of a squeezed image SI.

In an embodiment, after a pixel signal is generated, the row driver 120 (refer to FIG. 3) may provide a reset control signal RS having an active level to the reset transistor RX to remove photocharge packets accumulated in the floating diffusion node FD before the next pixel signal is generated.

Lenses having different degrees of squeezing may be used according to the number of photoelectric conversion elements arranged in the first direction among the photoelectric conversion elements PD_11 to PD_MN of the pixel PXc that are arranged in an M×N matrix. For example, when N is 2, the degree of squeezing of a real image in the first direction may be twice the degree of squeezing of the real image in the second direction, and when N is 4, the degree of squeezing of a real image in the first direction may be four times the degree of squeezing of the real image in the second direction. However, embodiments are not limited thereto, and the ratio of first-direction squeezing and second-direction squeezing of a lens be close to the number of photoelectric conversion elements arranged in the first direction.

Figure 13:
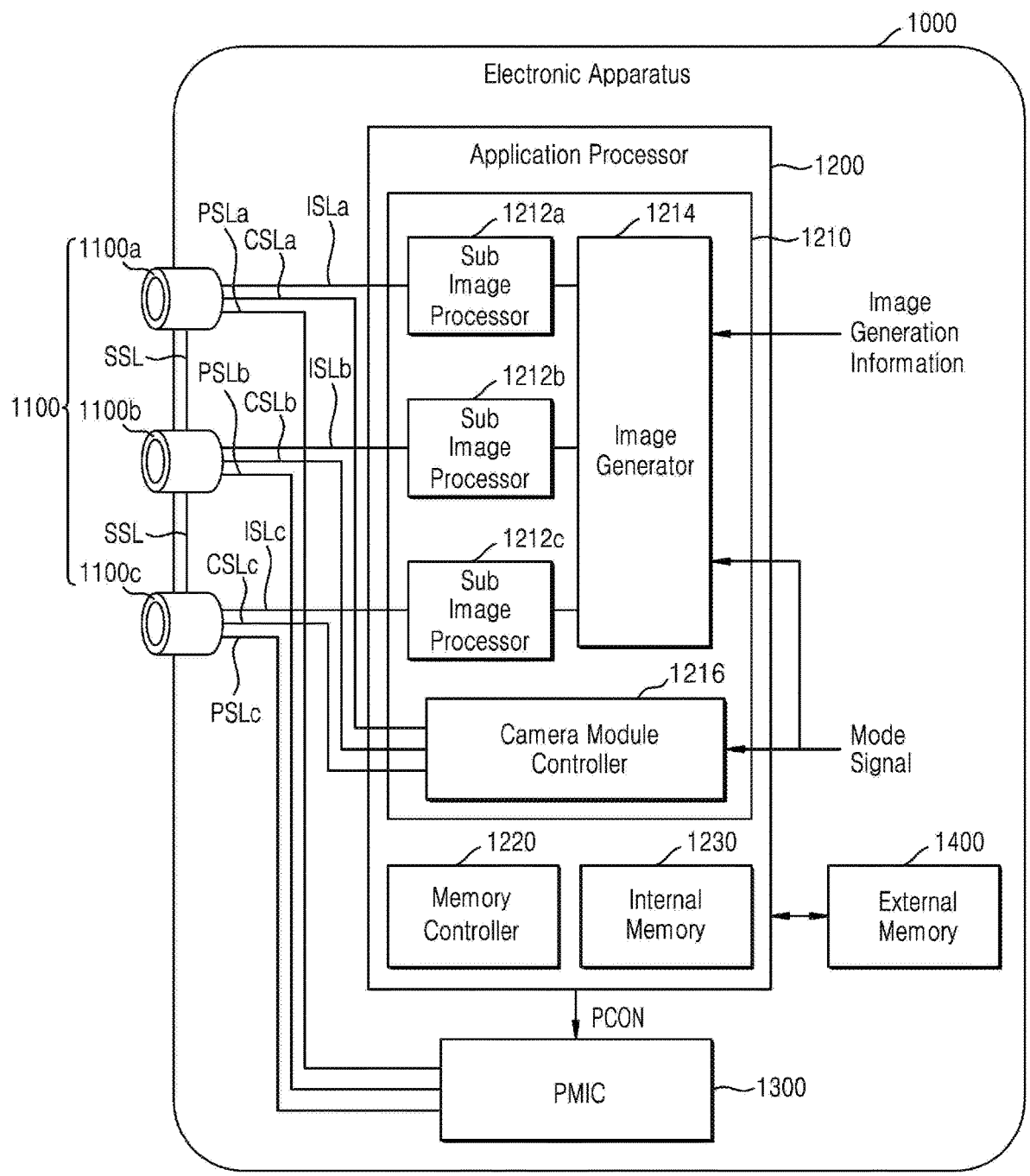
FIG. 13 is a block diagram illustrating an electronic apparatus including multiple camera modules according to an embodiment.
Figure 14:
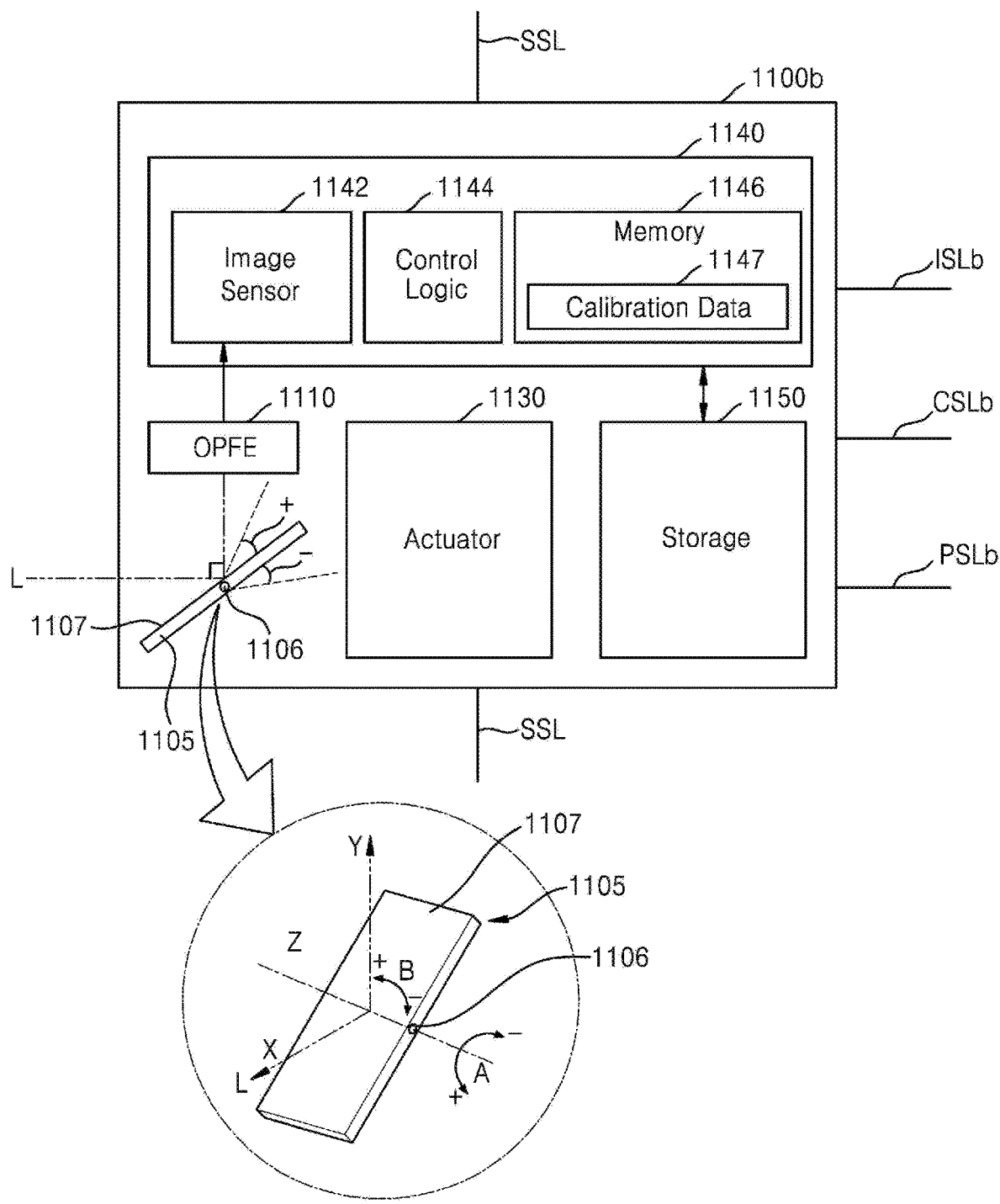
FIG. 14 is a block diagram illustrating a camera module shown in FIG. 13.

FIG. 13 is a block diagram illustrating an electronic apparatus 1000 including multiple camera modules, according to an embodiment. FIG. 14 is a block diagram illustrating a camera module 1100b of the electronic apparatus 1000 shown in FIG. 13.

Referring to FIG. 13, the electronic apparatus 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 13, embodiments are not limited thereto. In some embodiments, the camera module group 1100 may be modified to include only two camera modules. In some embodiments, the camera module group 1100 may be modified to include k camera modules, where k refers to any natural number greater than or equal to 4.

The configuration of the camera module 1100b will be described below with reference to FIG. 14. The following description of the camera module 1100b may also be applied to the other camera modules 1100a and 1100c.

Referring to FIG. 14, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from the outside.

In some embodiments, the prism 1105 may change the path of light L incident in the first direction (X direction) to the second direction (Y direction) perpendicular to the first direction (X direction). In addition, the prism 1105 may rotate the reflective surface 1107 of the light reflecting material in a direction A around a center shaft 1106 or rotate the center shaft 1106 in a direction B to change the path of light L incident in the first direction (X direction) to the second direction (Y direction). In this case, the OPFE 1110 may move in the third direction (Z direction) that is perpendicular to both of the first direction (X direction) and the second direction (Y direction).

In some embodiments, as illustrated in FIG. 14, an A-direction maximum rotation angle of the prism 1105 may be less than or equal to 15 degrees in a positive (+) direction A and greater than 15 degrees in a negative (−) direction A. However, embodiments are not limited thereto.

In some embodiments, the prism 1105 may move by an angle of about 20 degrees or in a range from about 10 degrees to about 20 degrees or from about 15 degrees to about 20 degrees in a positive (+) or negative (−) direction B. In this case, an angle by which the prism 1105 moves in the positive (+) direction B may be the same as or similar, within a difference of about 1 degree, to an angle by which the prism 1105 moves in the negative (−) direction B.

In some embodiments, the prism 1105 may move the reflective surface 1107 of the light reflecting material in the third direction (Z direction) parallel with an extension direction of the center shaft 1106.

The OPFE 1110 may include, for example, m optical lenses where m refers to a natural number. The m optical lenses may move in the second direction (Y direction) and change an optical zoom ratio of the camera module 1100*b*. For example, when the default optical zoom ratio of the camera module 1100*b* is Z, the optical zoom ratio of the camera module 1100*b* may be changed to 3Z, 5Z, or greater by moving the m optical lenses included in the OPFE 1110.

The actuator 1130 may move the OPFE 1110 or an optical lens to a certain position. For example, the actuator 1130 may adjust the position of the optical lens such that an image sensor 1142 may be positioned at a focal length of the optical lens for accurate sensing.

The image sensing device 1140 may include the image sensor 1142, a control logic 1144, and a memory 1146. The image sensor 1142 may sense an image of an object using light L provided through the optical lens. The image sensor 1142 may include a pixel array (for example, the pixel array 110 shown in FIG. 3) including a plurality of pixels (for example, the pixels PX shown in FIG. 3), and each of the pixels (for example, the pixels PX shown in FIG. 3) may include at least two photoelectric conversion elements.

A lens (for example, the lens 11 shown in FIG. 1) configured to generate a squeezed image by squeezing a real image may be positioned above the image sensor 1142, and the image sensor 1142 may capture the squeezed image by receiving light corresponding to the squeezed image via the plurality of pixels (for example, the pixels PX shown in FIG. 3). Each of the pixels (for example, the pixels PX shown in FIG. 3) of the image sensor 1142 may include at least two photoelectric conversion elements, and each of the photoelectric conversion elements may generate a photocharge packet in response to incident light corresponding to the squeezed image. A final image may be generated by reading out pixel signals generated based on the photocharge packets respectively generated by the at least two photoelectric conversion elements, and thus the aspect ratio of the final image may be greater than the aspect ratio of the squeezed image.

The control logic 1144 may control operations of the camera module 1100*b*. For example, the control logic 1144 may control operations of the camera module 1100*b* according to control signals provided through a control signal line CSLb.

The memory 1146 may store information, such as calibration data 1147, necessary for operations of the camera module 1100*b*. The calibration data 1147 may include information that is necessary for the camera module 1100*b* to generate image data using light L incident from the outside. For example, the calibration data 1147 may include information about the degree of rotation, information about a focal length, information about an optical axis, or the like. When the camera module 1100*b* is implemented as a multistate camera that has a focal length varying with the position of the optical lens, the calibration data 1147 may include a focal length value for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, the storage 1150 may include electrically erasable programmable read-only memory (EEPROM). However, embodiments are not limited thereto.

Referring to FIGS. 13 and 14, in some embodiments, the camera modules 1100*a*, 1100*b*, and 1100*c* may respectively include actuators 1130. In this case, the camera modules 1100*a*, 1100*b*, and 1100*c* may include the same or different pieces of calibration data 1147 according to operations of the actuators 1130 of the camera modules 1100*a*, 1100*b*, and 1100*c*.

In some embodiments, one (for example, the camera module 1100*b*) of the camera modules 1100*a*, 1100*b*, and 1100*c* may be of a folded-lens type including the prism 1105 and the OPFE 1110 while the other camera modules (for example, the camera modules 1100*a* and 1100*c*) may be of a vertical type that does not include the prism 1105 and the OPFE 1110. However, embodiments are not limited thereto.

In some embodiments, one (for example, the camera module 1100*c*) of the camera modules 1100*a*, 1100*b*, and 1100*c* may include a depth camera of a vertical type that is capable of extracting depth information using infrared (IR) rays. In this case, the application processor 1200 may generate a three-dimensional (3D) depth image by merging image data provided from the depth camera with image data provided from another camera module (for example, the camera module 1100*a* or 1100*b*).

In some embodiments, at least two camera modules (for example, the camera modules 1100*a* and 1100*b*) among the camera modules 1100*a*, 1100*b*, and 1100*c* may have different fields of view. In this case, for example, the at least two camera modules (for example, the camera modules 1100*a* and 1100*b*) among the camera modules 1100*a*, 1100*b*, and 1100*c* may respectively have different optical lenses. However, embodiments are not limited thereto.

In some embodiments, the camera modules 1100*a*, 1100*b*, and 1100*c* may have fields of view that are different from each other. In this case, the camera modules 1100*a*, 100*b*, and 1100*c* may have different optical lenses. However, embodiments are not limited thereto.

In some embodiments, the camera modules 1100*a*, 1100*b*, and 1100*c* may be physically separated from each other. In other words, instead of dividing the sensing area of one image sensor 1142 for the camera modules 1100*a*, 1100*b*, and 1100*c*, the camera modules 1100*a*, 1100*b*, and 1100*c* may respectively include independent image sensors 1142.

Referring back to FIG. 13, the application processor 1200 may include an image processing unit 1210, a memory controller 1220, and an internal memory 1230. The application processor 1200 may be implemented separately from the camera modules 1100*a*, 1100*b*, and 1100*c*. For example, the application processor 1200 and the camera modules 1100*a*, 1100*b*, and 1100*c* may be implemented in different semiconductor chips separate from each other.

The image processing unit 1210 may include a plurality of sub-image processors 1212*a*, 1212*b*, and 1212*c*, an image generator 1214, and a camera module controller 1216.

The image processing unit 1210 may include as many sub-image processors 1212*a*, 1212*b*, and 1212*c* as the number of camera modules 1100*a*, 1100*b*, and 1100*c*.

Pieces of image data respectively generated by the camera modules 1100*a*, 1100*b*, and 1100*c* may be respectively provided to the sub-image processors 1212*a*, 1212*b*, and 1212*c* through image signal lines ISLa, ISLb, and ISLc separated from each other. For example, image data generated by the camera module 1100a may be provided to the sub-image processor 1212a through the image signal line ISLa, image data generated by the camera module 1100b may be provided to the sub-image processor 1212b through the image signal line ISLb, and image data generated by the camera module 1100c may be provided to the sub-image processor 1212c through the image signal line ISLc. Such image data transmission may be performed using, for example, camera serial interface (CSI) that is based on mobile industry processor interface (MIPI). However, embodiments are not limited thereto.

In some embodiments, a single sub-image processor may be provided for a plurality of camera modules. For example, the sub-image processors 1212a and 1212c may not be separated but may be integrated into a single sub-image processor, and the image data provided from the camera module 1100a or the camera module 1100c may be selected by a selection element (for example, a multiplexer) and then provided to the integrated sub-image processor.

The sub-image processors 1212a, 1212b, and 1212c may perform a re-mosaic process on image data received from the camera modules 1100a, 1100b, and 1100c or a plurality of camera modules corresponding thereto.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information or a mode signal.

For example, according to the image generation information or the mode signal, the image generator 1214 may generate the output image by merging at least portions of pieces of image data that are respectively generated by the camera modules 1100a, 1100b, and 1100c having different fields of view. In addition, according to the image generation information or the mode signal, the image generator 1214 may generate the output image by selecting one of pieces of image data that are respectively generated by the camera modules 1100a, 1100b, and 1100c having different fields of view.

In some embodiments, the image generation information may include a zoom signal or a zoom factor. In some embodiments, the mode signal may be based on a mode selected by a user.

When the image generation information includes a zoom signal (e.g., a zoom factor) and the camera modules 1100a, 1100b, and 1100c have different fields of view from each other, the image generator 1214 may perform different operations according to the type of the zoom signal. For example, when the zoom signal is a first signal, the image generator 1214 may merge image data output from the camera module 1100a with image data output from the camera module 1100c, and may then generate an output image by using an image signal obtained by the merging as well as image data output from the camera module 1100b and not merged with other image data. When the zoom signal is a second signal different from the first signal, the image generator 1214 may generate an output image by selecting one of the pieces of image data respectively output from the camera modules 1100a, 1100b, and 1100c, instead of merging the pieces of image data with each other. However, embodiments are not limited thereto, and a method of processing image data may be changed when necessary.

In some embodiments, the image generator 1214 may receive a plurality of pieces of image data, which have different exposure times, from at least one of the sub-image processors 1212a, 1212b, and 1212c and may perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through the control signal lines CSLa, CSLb, and CSLc that are separate from each other.

One (for example, the camera module 1100b) of the camera modules 1100a, 100b, and 1100c may be designated as a master camera module according to the mode signal or the image generation signal including a zoom signal, and the other camera modules (for example, the camera modules 1100a and 1100c) may be designated as slave camera modules. Such designation information may be included in a control signal and provided to a corresponding one of the camera modules 1100a, 1100b, and 1100c through the control signal lines CSLa, CSLb, and CSLc that are separate from each other.

A camera module operating as a master or a slave may be determined according to a zoom factor or an operation mode signal. For example, when the field-of-view of the camera module 1100a is greater than that of the camera module 1100b and the zoom factor indicates a low zoom ratio, the camera module 1100a may operate as a master and the camera module 1100b may operate as a slave. Contrarily, when the zoom factor indicates a high zoom ratio, the camera module 1100b may operate as a master and the camera module 1100a may operate as a slave.

In some embodiments, a control signal provided from the camera module controller 1216 to each of the camera modules 1100a, 1100b, and 1100c may include a sync enable signal. For example, when the camera module 1100b is a master camera module and the camera module 1100a is a slave camera module, the camera module controller 1216 may transmit the sync enable signal to the camera module 1100b. When the camera module 1100b receives the sync enable signal, the camera module 1100b may generate a sync signal based on the sync enable signal and may provide the sync signal to the camera modules 1100a and 1100c through a sync signal line SSL. The camera modules 1100a, 1100b, and 1100c may be synchronized with the sync signal and may transmit image data to the application processor 1200.

In some embodiments, a control signal provided from the camera module controller 1216 to each of the camera modules 1100a, 1100b, and 1100c may include mode information according to a mode signal. The mode signal may be input to the camera module controller 1216. The camera modules 1100a, 1100b, and 1100c may operate in a first operation mode or a second operation mode with a sensing speed based on the mode information.

In the first operation mode, the camera modules 1100a, 1100b, and 1100c may generate an image signal at a first speed (for example, at a first frame rate), encode the image signal at a second speed greater than the first speed (for example, at a second frame rate greater than the first frame rate), and transmit the encoded image signal to the application processor 1200. In this case, the second speed may be 30 times or less the first speed.

The application processor 1200 may store the received image signal, in other words, the encoded image signal, in the internal memory 1230 or the external memory 1400 provided outside the application processor 1200. Thereafter, the application processor 1200 may read the encoded image signal from the internal memory 1230 or the external memory 1400, decode the encoded image signal, and display image data generated based on the decoded image signal. For example, a corresponding one of the sub-image processors 1212a, 1212b, and 1212c of the image processing unit 1210 may decode the encoded image signal and may also perform image processing on the decoded image signal.

In the second operation mode, the camera modules 1100a, 1100b, and 1100c may generate an image signal at a third speed less than the first speed (for example, at a third frame rate less than the first frame rate) and may transmit the image signal to the application processor 1200. The image signal provided to the application processor 1200 may be a non-encoded image signal. The application processor 1200 may perform image processing on the image signal or store the image signal in the internal memory 1230 or the external memory 1400.

The PMIC 1300 may provide power, for example, power supply voltage, to each of the camera modules 1100a, 1100b, and 1100c. For example, under control by the application processor 1200, the PMIC 1300 may provide a first piece of power to the camera module 1100a through a power signal line PSLa, a second piece of power to the camera module 1100b through a power signal line PSLb, and a third piece of power to the camera module 1100c through a power signal line PSLc.

The PMIC 1300 may generate power corresponding to each of the camera modules 1100a, 1100b, and 1100c and adjust the level of the power, in response to a power control signal PCON received from the application processor 1200. The power control signal PCON may include a power adjustment signal for each operation mode of the camera modules 1100a, 1100b, and 1100c. For example, the operation mode may include a low-power mode. In this case, the power control signal PCON may include information about a camera module to be operated in the low-power mode and information on a set power level. The same level or different levels of power may be provided to the camera modules 1100a, 1100b, and 1100c. In addition, the level of power may be dynamically varied.

While the inventive concept has been particularly shown and described with reference to embodiments thereof, it will be understood that various changes in form and details may be made thereto without departing from the spirit and scope of the following claims.

What is claimed is:

1. An imaging apparatus comprising:
a lens configured to squeeze a real image to generate a squeezed image having a first aspect ratio; and
an image sensor comprising a plurality of pixels and configured to capture the squeezed image using the plurality of pixels and generate image data corresponding to a final image having a second aspect ratio that is greater than the first aspect ratio,
wherein the squeezed image comprises a plurality of subregions respectively corresponding to the plurality of pixels,
wherein each of the plurality of pixels comprises:
a first photoelectric conversion element configured to generate a first photocharge packet in response to incident light on a first section included in a corresponding subregion;
a second photoelectric conversion element configured to generate a second photocharge packet in response to incident light on a second section included in the corresponding subregion, wherein the second section is adjacent to the first section in a first direction; and
a floating diffusion node connected to the first photoelectric conversion element and the second photoelectric conversion element,
wherein the final image comprises: a first pixel section corresponding to a first pixel signal that is based on the first photocharge packet; and a second pixel section corresponding to a second pixel signal that is based on the second photocharge packet, wherein the second pixel section is adjacent to the first pixel section.

2. The imaging apparatus of claim 1, wherein the first photoelectric conversion element is adjacent to the second photoelectric conversion element in the first direction, and the first pixel section is adjacent to the second pixel section in the first direction.

3. The imaging apparatus of claim 1, wherein the second aspect ratio is twice the first aspect ratio.

4. The imaging apparatus of claim 1, wherein the second aspect ratio is greater than an aspect ratio of the image sensor.

5. The imaging apparatus of claim 1, wherein each of the plurality of pixels further comprises:
a first transfer transistor connected between the first photoelectric conversion element and the floating diffusion node;
a second transfer transistor connected between the second photoelectric conversion element and the floating diffusion node; and
a reset transistor connected between the floating diffusion node and a pixel power supply voltage.

6. The imaging apparatus of claim 5, wherein the image sensor further comprises a row driver configured to provide a first transfer control signal having an active level to the first transfer transistor at a first time point, a second transfer control signal having an active level to the second transfer transistor at a second time point, and a reset control signal having an active level to the reset transistor at a time point between the first time point and the second time point.

7. The imaging apparatus of claim 5, wherein the image sensor further comprises a row driver configured to provide:
at a first time point, a first transfer control signal having an active level to the first transfer transistors respectively included in at least two pixels adjacent to each other in a second direction perpendicular to the first direction;
at a second time point, a second transfer control signal having an active level to the second transfer transistors respectively included in the at least two pixels adjacent to each other in the second direction; and
at a time point between the first time point and the second time point, a reset control signal having an active level to the reset transistors respectively included in the at least two pixels adjacent to each other in the second direction.

8. The imaging apparatus of claim 7, wherein the second aspect ratio is four or more times the first aspect ratio.

9. An imaging apparatus comprising:
a lens configured to squeeze a real image to generate a squeezed image having a first aspect ratio; and
an image sensor comprising a plurality of pixels and configured to capture the squeezed image using the plurality of pixels and generate image data corresponding to a final image having a second aspect ratio that is greater than the first aspect ratio, wherein the squeezed image comprises a plurality of subregions respectively corresponding to the plurality of pixels, wherein each of the plurality of pixels comprises M*N photoelectric conversion elements arranged in an M×N matrix and respectively corresponding to M*N sections included in a corresponding subregion, the M*N photoelectric conversion elements being configured to generate photocharge packets in response to incident light on the M*N sections, wherein the final image comprises N pixel sections each based on photocharge packets generated by M photoelectric conversion elements that are consecutive in a second direction among the M*N photoelectric conversion elements, wherein each of the M and the N is an integer greater than or equal to 2.

10. The imaging apparatus of claim 9, wherein the N pixel sections are continuous in a first direction perpendicular to the second direction.

11. The imaging apparatus of claim 9, wherein the second aspect ratio is N times the first aspect ratio.

12. The imaging apparatus of claim 9, wherein the second aspect ratio is greater than an aspect ratio of the image sensor.

13. The imaging apparatus of claim 9, wherein, in each of the plurality of pixels, the M*N photoelectric conversion elements arranged in an M×N matrix are each connected to a floating diffusion node.

14. The imaging apparatus of claim 13, wherein each of the plurality of pixels further comprises M*N transfer transistors respectively connected between the floating diffusion node and the M*N photoelectric conversion elements.

15. The imaging apparatus of claim 14, wherein the image sensor further comprises a row driver configured to simultaneously provide a transfer control signal having an active level to M transfer transistors respectively connected to the M photoelectric conversion elements that are consecutive in the second direction among the M*N photoelectric conversion elements.

16. The imaging apparatus of claim 14, wherein the image sensor further comprises a row driver configured to simultaneously provide a transfer control signal having an active level to M transfer transistors respectively connected to the M photoelectric conversion elements that are consecutive in the second direction in each of at least two pixels consecutive in the second direction.

17. The imaging apparatus of claim 16, wherein the second aspect ratio is N*2 or more times the first aspect ratio.

18. An imaging system comprising:

a lens configured to squeeze a real image to generate a squeezed image having a first aspect ratio;

an image sensor comprising a plurality of pixels and configured to capture the squeezed image via the plurality of pixels to generate image data corresponding to a final image having a second aspect ratio that is greater than the first aspect ratio; and a processor configured to perform re-mosaic processing on the image data, wherein the squeezed image comprises a plurality of subregions respectively corresponding to the plurality of pixels, wherein each of the plurality of pixels comprises:

a first photoelectric conversion element configured to generate a first photocharge packet in response to incident light on a first section included in a corresponding subregion;

a second photoelectric conversion element configured to generate a second photocharge packet in response to incident light on a second section included in the corresponding subregion, wherein the second section is adjacent to the first section in a first direction; and a floating diffusion node connected to the first photoelectric conversion element and the second photoelectric conversion element, wherein the final image comprises a first pixel section corresponding to a first pixel signal based on the first photocharge packet, and a second pixel section corresponding to a second pixel signal based on the second photocharge packet, and the first pixel section and the second pixel section are adjacent to each other in the first direction.

19. The imaging system of claim 18, wherein an aspect ratio of the image sensor is greater than or equal to the first aspect ratio and is less than the second aspect ratio.

20. The imaging apparatus of claim 18, wherein the processor is further configured to generate Bayer-pattern image data by performing the re-mosaic processing on the image data.

* * * * *